United States Patent
Kim et al.

(10) Patent No.: US 9,544,175 B2
(45) Date of Patent: Jan. 10, 2017

(54) METHOD AND DEVICE FOR SELECTIVE DECODING OF BEACON FRAME IN WIRELESS LAN SYSTEM

(71) Applicant: LG ELECTRONICS INC., Seoul (KR)

(72) Inventors: Jeongki Kim, Anyang-si (KR); Jinsam Kwak, Anyang-si (KR); Yongho Seok, Anyang-si (KR); Seunghee Han, Anyang-si (KR); Jinsoo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 14/391,131

(22) PCT Filed: Apr. 15, 2013

(86) PCT No.: PCT/KR2013/003143
§ 371 (c)(1),
(2) Date: Oct. 7, 2014

(87) PCT Pub. No.: WO2013/154405
PCT Pub. Date: Oct. 17, 2013

(65) Prior Publication Data
US 2015/0098447 A1  Apr. 9, 2015

Related U.S. Application Data

(60) Provisional application No. 61/623,589, filed on Apr. 13, 2012.

(51) Int. Cl.
*H04L 27/26* (2006.01)
*H04W 74/00* (2009.01)
(Continued)

(52) U.S. Cl.
CPC ......... *H04L 27/2649* (2013.01); *H04L 1/0053* (2013.01); *H04L 1/0075* (2013.01);
(Continued)

(58) Field of Classification Search
None
See application file for complete search history.

(56) References Cited

U.S. PATENT DOCUMENTS 8,072,980 B1 * 12/2011 Zhang ............... H04W 99/00
370/392
2005/0265333 A1   12/2005 Coffey et al.
(Continued)

FOREIGN PATENT DOCUMENTS

WO    2011115431 A2    9/2011

*Primary Examiner* — Brian Roberts
(74) *Attorney, Agent, or Firm* — Dentons US LLP

(57) ABSTRACT

The present invention relates to a wireless communication system, and more particularly, to a method and device for performing or supporting selective decoding of a beacon frame in a wireless LAN system. A method of decoding a frame by a station STA in a wireless communication system according to an embodiment of the present invention may include: determining whether to decode each of a first data portion and a second data portion of the frame; and decoding one or more of the first data portion and the second data portion if it is determined that the decoding is performed. Hence, the frame may further include information that is used for the determination by the station STA on whether to decode each of the first data portion and the second data portion, and whether to decode may be determined on the basis of whether to change one or more of the first data portion and the second data portion.

15 Claims, 17 Drawing Sheets

(51) Int. Cl.
     *H04L 29/06*      (2006.01)
     *H04W 12/06*     (2009.01)
     *H04L 1/00*       (2006.01)

(52) U.S. Cl.
     CPC ...... *H04L 27/2602* (2013.01); *H04L 27/2627* (2013.01); *H04L 69/22* (2013.01); *H04W 12/06* (2013.01); *H04W 74/00* (2013.01); *H04L 27/2613* (2013.01)

(56) References Cited

U.S. PATENT DOCUMENTS

| | | | |
|---|---|---|---|
| 2007/0171933 A1 | 7/2007 | Sammour et al. | |
| 2008/0159205 A1 | 7/2008 | Sekiya et al. | |
| 2011/0075597 A1 | 3/2011 | Arora | |
| 2011/0263250 A1 | 10/2011 | Mueck et al. | |
| 2012/0051312 A1* | 3/2012 | Noh | H04W 76/023 370/329 |
| 2012/0063335 A1* | 3/2012 | Cho | H04W 8/186 370/252 |
| 2013/0170411 A1* | 7/2013 | Vermani | H04L 1/0001 370/310 |

* cited by examiner

FIG. 7
(a) 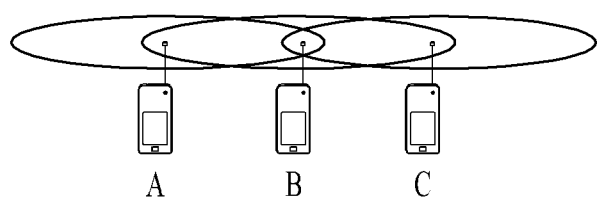
(b) 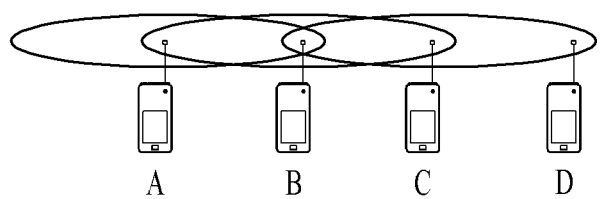

us 9,544,175 B2

METHOD AND DEVICE FOR SELECTIVE DECODING OF BEACON FRAME IN WIRELESS LAN SYSTEM

This application is a National Stage Application of International Patent Application No. PCT/KR2013/003143, filed on Apr. 15, 2013, and claims the benefit of U.S. Provisional Application No. 61/623,589, filed on Apr. 13, 2012, in the United States Patent and Trademark Office, all of which are incorporated herein by reference in their entirety.

TECHNICAL FIELD

The present invention relates to a wireless communication system, and more particularly, to a method of performing or supporting a selective decoding of a beacon frame a wireless LAN system and apparatus therefor.

BACKGROUND ART

Recently, various kinds of wireless communication technologies have been developed together with the developments of the information communication technology. Particularly, wireless LAN (WLAN) is the technology for accessing Internet by wireless in a home, a company or a specific service provided area using such a mobile user equipment as a personal digital assistant (PDA), a laptop computer, a portable multimedia player (PMP) and the like based on a radio frequency technology.

In order to overcome the limitation put on a communication speed pointed out as a weak point of WLAN, the recent technology standard has introduced a system having an enhanced speed and reliability of a network and an extended operating distance of a wireless network. For instance, IEEE 802.11n has introduced the application of MIMO (Multiple Inputs and Multiple Outputs) that uses multiple antennas at both ends including a transmitting unit and a receiving unit in order to support high throughput for a data processing speed over maximum 540 Mbps, minimize transmission error, and optimize a data rate or speed.

DISCLOSURE OF THE INVENTION

Technical Tasks

Ongoing discussions are made on M2M (Machine-to-Machine) communication technology as a next generation communication technology. In IEEE 802.11 WLAN system, a technological standard for supporting M2M communication is developed as IEEE 802.11ah. M2M communication can consider a scenario of transceiving a small amount of data at low speed occasionally in an environment having numerous devices exist therein.

Communication in WLAN system is performed by a medium shared between all devices. In case that the number of devices increases like M2M communication, a considerable time is consumed for a channel access of a single device. Hence, overall system performance is degraded and power saving of each of the devices is interrupted.

One technical task of the present invention is to provide a new mechanism for performing or supporting a selective decoding of a beacon frame.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of decoding a frame, which is decoded by a station (STA) in a wireless communication system, according to one embodiment of the present invention may include the steps of determining whether to perform a decoding on each of a first data part and a second data part of the frame and if it is determined to perform the decoding, performing the decoding on at least one of the first data part or the second data part, wherein the frame further comprises information used for the determination made by the STA on whether to perform the decoding on each of the first data part and the second data part and wherein whether to perform the decoding is determined based on a change of at least one of the first data part or the second data part.

To further achieve these and other advantages and in accordance with the purpose of the present invention, as embodied and broadly described, a method of encoding a frame, which is encoded by an access point (AP) in a wireless communication system, according to another embodiment of the present invention may include the steps of encoding each of a first data part and a second data part of the frame separately and transmitting the frame including the first data part and the second data part to a station (STA), wherein the frame further comprises information used for a determination made by the STA on whether to perform a decoding on each of the first data part and the second data part and wherein whether to perform the decoding is determined based on a change of at least one of the first data part or the second data part.

To further achieve these and other advantages and in accordance with the purpose of the present invention, as embodied and broadly described, a station device for decoding a frame in a wireless communication system according to further embodiment of the present invention may include a transceiver and a processor determining whether to perform a decoding on each of a first data part and a second data part of the frame, the processor, if determining to perform the decoding, configured to perform the decoding on at least one of the first data part or the second data part, wherein the frame further comprises information used for the determination made by the STA on whether to perform the decoding on each of the first data part and the second data part and wherein whether to perform the decoding is determined based on a change of at least one of the first data part or the second data part.

To further achieve these and other advantages and in accordance with the purpose of the present invention, as embodied and broadly described, an access point (AP) device, which encodes a frame in a wireless communication system, according to another further embodiment of the present invention may include a transceiver and a processor encoding each of a first data part and a second data part of the frame separately, the processor configured to transmit the frame including the first data part and the second data part to a station (STA) using the transceiver, wherein the frame further comprises information used for a determination made by the STA on whether to perform a decoding on each of the first data part and the second data part and wherein whether to perform the decoding is determined based on a change of at least one of the first data part or the second data part.

The following matters may be applicable in common to the above-mentioned embodiments of the present invention.

Whether to perform the decoding may be determined using information included in an SIG (signal) field of the frame.

The SIG field may include a change count information.

The SIG field may include at least one of change count information on the first data part or change count information on the second data part.

If a value of change count information on the first data part is incremented, it may be determined to perform the decoding on the first data part. If a value of change count information on the second data part is incremented, it may be determined to perform the decoding on the second data part.

The SIG field may include at least one of information indicating a total length of the first data part and the second data part, information indicating a total length of the first data part, or information indicating a start offset of the second data part.

The SIG field may include at least one of information indicating whether the frame is a beacon frame, or information indicating whether a TIM (traffic indication map) information element is included in one of the first data part and the second data part.

The first data part may include information indicating whether a TIM information element is included in the frame.

If the information indicating whether the TIM information element is included indicates that the TIM information element is not included in the frame, it may be determined not to decode the second data part.

The first data part may include a MAC (medium access control) header, a first frame body and a first FCS (frame check sequence) field.

The second data part may include a second frame body and a second FCS field.

The frame may include a PPDU (physical layer convergence protocol (PLCP) packet data unit) frame, the frame may further include an STF (short training field) and an LTF (long training field), and the first data part and the second data part may be included in an MPDU (MAC PDU) part of the PPDU frame.

The above-mentioned general description of the present invention and the following details of the present invention are exemplary and may be provided for the additional description of the invention disclosed in claims.

Advantageous Effects

According to the present invention, a new method and apparatus for performing or supporting a selective decoding of a beacon frame can be provided.

Effects obtainable from the present invention are non-limited by the above mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 7 is a diagram to describe a hidden node and an exposed node.

BEST MODE FOR INVENTION

Figure 1:
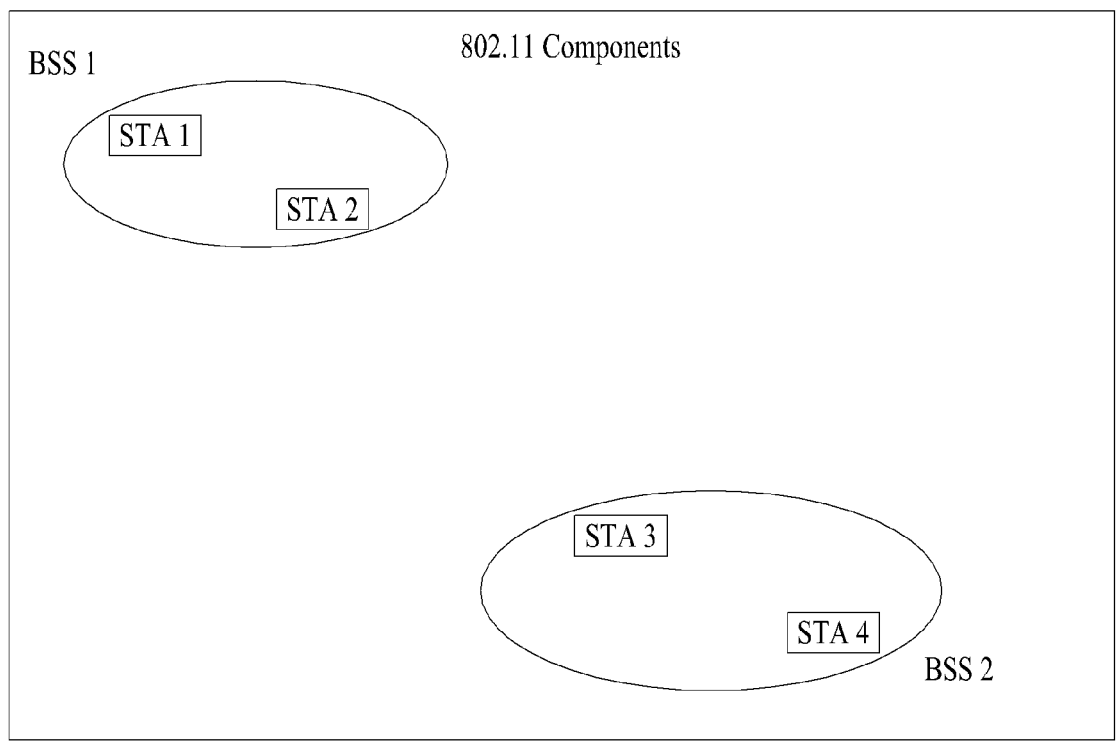
FIG. 1 is a diagram for one example of a structure of IEEE 802.11 system to which the present invention is applicable.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention can be implemented without these details.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention can be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, the following description mainly concerns IEEE 802.11 system, by which the technical idea of the present invention is non-limited.

Structure of WLAN System

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Figure 2:
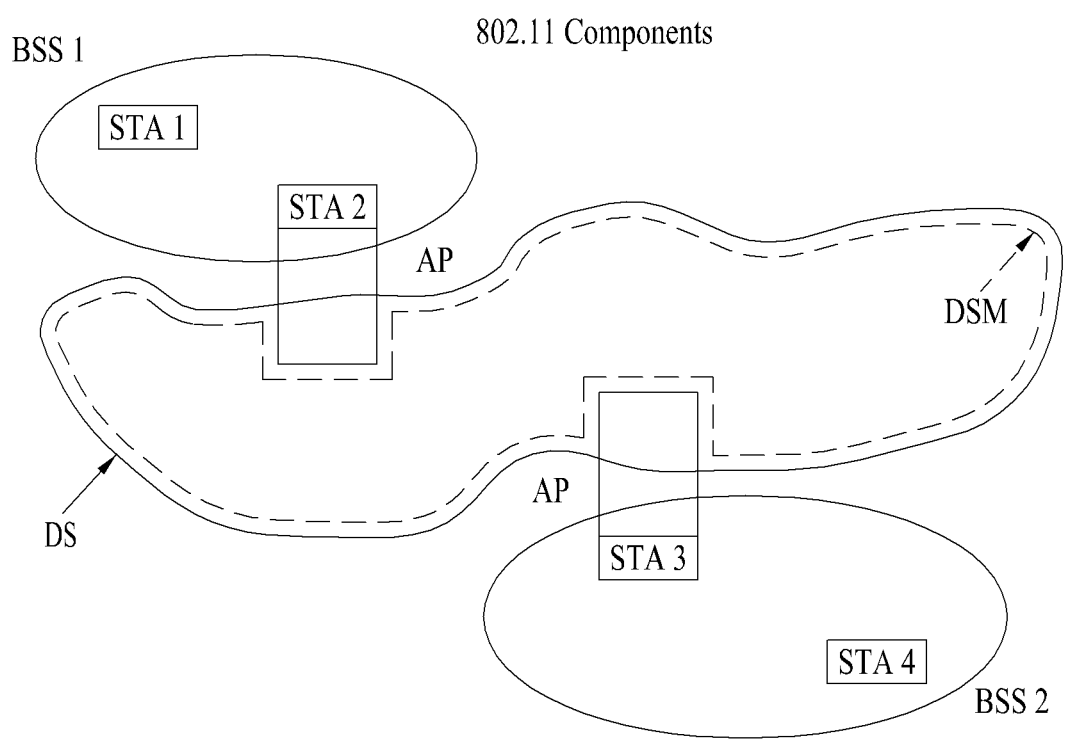
FIG. 2 is a diagram for another example of a structure of IEEE 802.11 system to which the present invention is applicable.

FIG. 2 is a diagram for another example of a structure of IEEE 802.11 system to which the present invention is applicable. In FIG. 2, components including a distribution system (DS), a distribution system medium (DSM), an access point (AP) and the like are added to the structure shown in FIG. 1.

A direct station-to-station distance in LAN may be limited by PHY performance. This distance limit may be enough for some cases. Yet, a station-to-station communication in farther distance may be necessary in some cases. In order to support an extended coverage, a distribution system (DS) may be configured.

The DS means a structure in which BSSs are mutually connected to each other. In particular, BSS may exist as a component of an extended type in a network including a plurality of BSSs instead of existing independently as shown in FIG. 1.

The DS corresponds to a logical concept and may be specified by a feature of a distribution system medium (DSM). Regarding this, IEEE 802.11 standard logically discriminates a wireless medium (WM) and a distribution system medium (DSM) from each other. Each of the logical media is used for a different purpose and is also used by a different component. According to the definitions in the IEEE 802.11 standard, the media are not limited to the same or the different. Thus, considering the fact that a plurality of media are logically different from each other, the flexibility of the IEEE 802.11 LAN structure (e.g., DS structure, other network structures, etc.) can be explained. In particular, the IEEE 802.11 LAN structure can be implemented into various examples. And, the corresponding LAN structure can be specified independently by a physical property of each of the implementation examples.

The DS can support a mobile device in a manner of providing seamless integration of a plurality of BSSs and logical services necessary for handling an address to a destination.

The AP means an entity that enables associated STAs to access a DS via WM and has STA functionality. Via the AP, data transfer between BSS and DS can be performed. For instance, STA 2 shown in FIG. 2 has functionality of STA and provides a function of enabling an associated STA (i.e., STA 1) to access a DS. For another instance, STA 3 shown in FIG. 2 has functionality of STA and provides a function of enabling an associated STA (i.e., STA 4) to access a DS. Since every AP basically corresponds to STA, it is an addressable entity. It may not be necessary for an address used by AP for communication on WM to be identical to an address used by AP for communication on DSM.

Data transmitted from one of STAs associated with an AP to an STA address of the AP is always received by an uncontrolled port and can be processed by IEEE 802.1X port access entity. Moreover, once a controlled port is authenticated, a transmitted data (or frame) can be forwarded to a DS.

Figure 3:
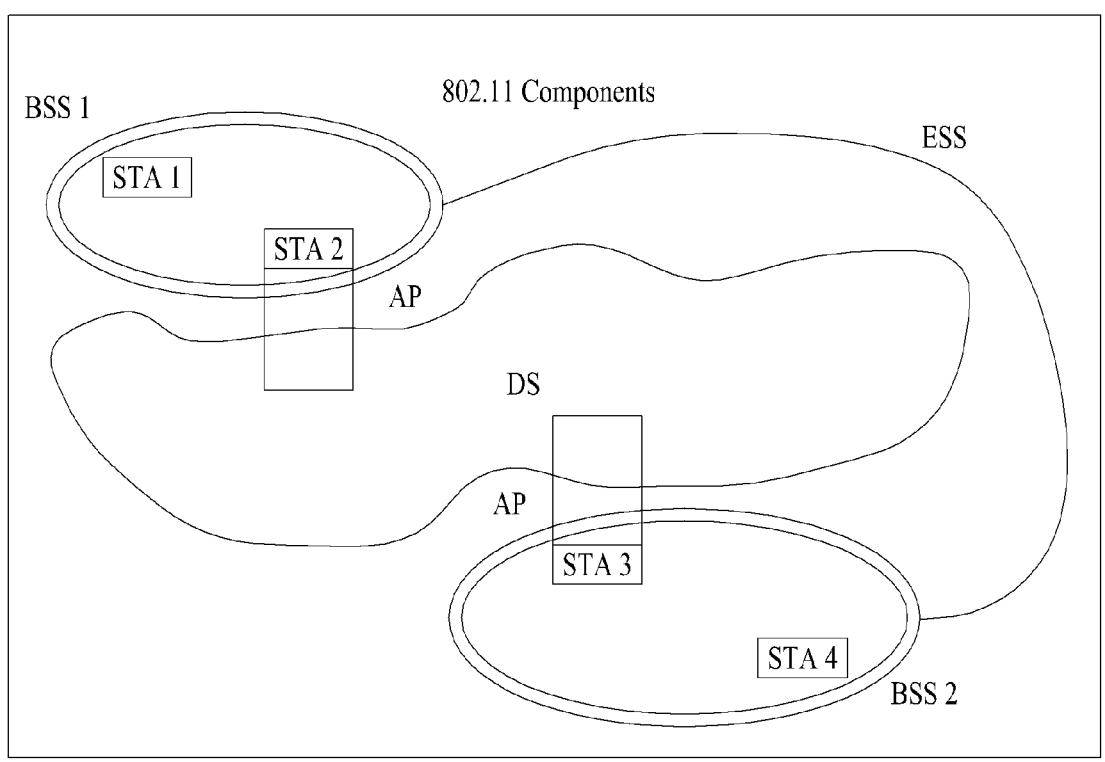
FIG. 3 is a diagram for a further example of a structure of IEEE 802.11 system to which the present invention is applicable.

FIG. 3 is a diagram for a further example of a structure of IEEE 802.11 system to which the present invention is applicable. FIG. 3 conceptionally shows an extended service set (ESS) to additionally provide a wide coverage to the structure shown in FIG. 2.

A wireless network having an arbitrary size and complexity can be configured with a DS and BSSs. In IEEE 802.11 system, such a network is called an ESS network. The ESS may correspond to a set of BSSs connected to a single DS. Yet, the ESS does not include the DS. The ESS network is characterized in looking like an IBSS network in LLC (logical link control) layer. STAs included in the ESS can communicate with each other and mobile STAs can move away from one BSS into another BSS (within the same ESS) in a manner of being transparent to LLC.

IEEE 802.11 assumes nothing about relatively physical locations of the BSSs shown in FIG. 3 and enables the following types. First of all, BSSs can overlap with each other in part, which is the type generally used to provide a continuous coverage. BSSs may not be connected to each other physically and no limitation is put on a distance between BSSs logically. BSSs can be physically situated at the same location, which can be used to provide redundancy. One IBSS (or at least one IBSS) or ESS networks can physically exist as one ESS network (or at least one ESS network) in the same space. This may correspond to an ESS network type in one of a case that an ad-hoc network operates at an ESS network exiting location, a case that IEEE 802.11 networks physically overlapping with each other are configured by different organizations, a case that at least two different access and security policies are necessary at the same location, and the like.

Figure 4:
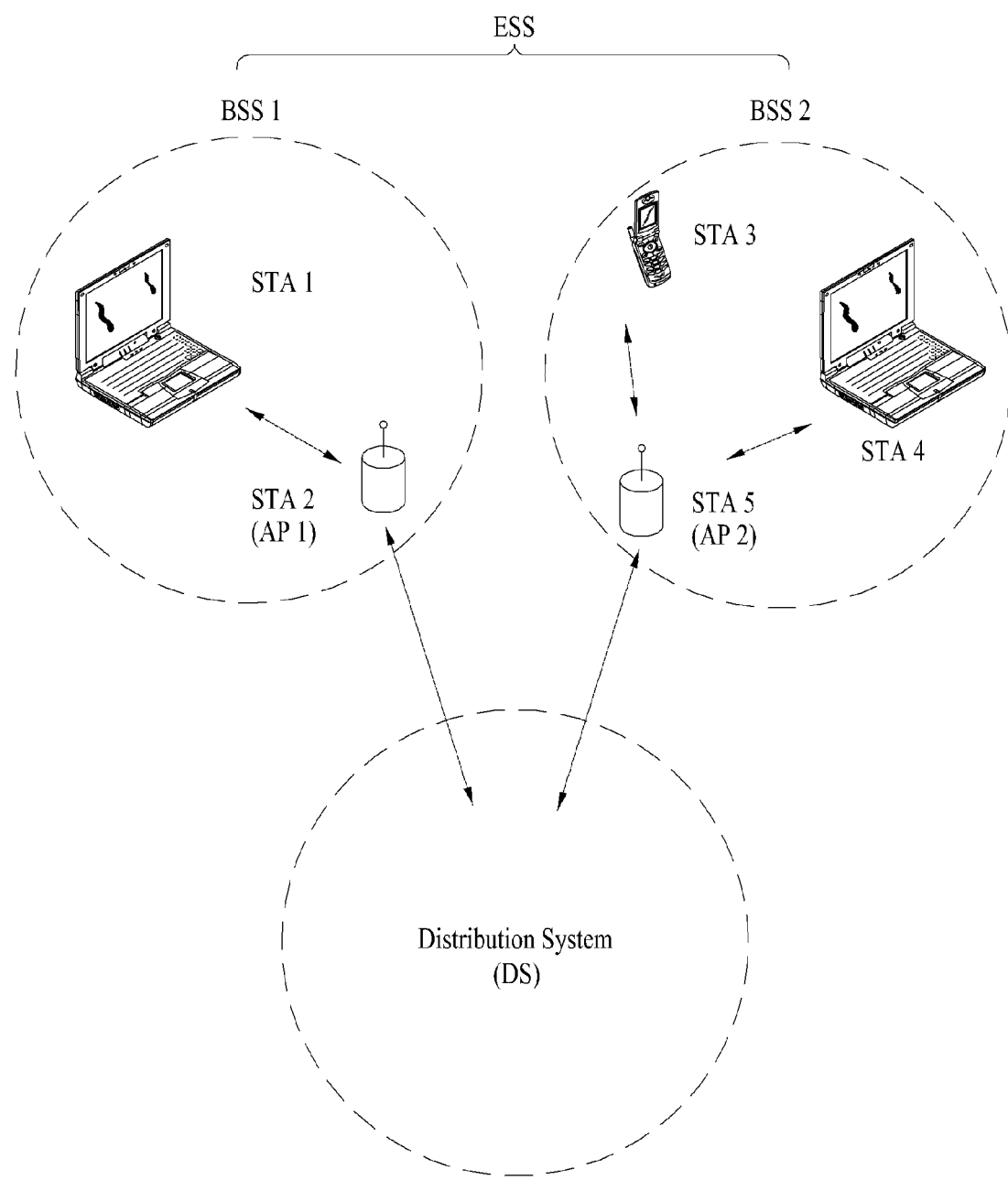
FIG. 4 is a diagram for one example of a structure of WLAN system.

FIG. 4 is a diagram for one example of a structure of WLAN system. In particular, FIG. 4 shows one example of BSS in DS-included infrastructure.

In the example shown in FIG. 4, BSS 1 and BSS 2 configure an ESS. In WLAN system, STA is a device that operates by MAC/PHY regulations of IEEE 802.11. The STA includes an AP STA and a non-AP STA. The non-AP STA generally corresponds to such a device directly handled by a user as a laptop, a mobile phone and the like. In the example shown in FIG. 4, STA 1, STA 3 and STA 4 correspond to non-AP STAs. And, STA 2 and STA 5 correspond to AP STAs.

In the following description, the non-AP STA can be called a terminal, a Wireless Transmit/Receive Unit (WTRU), a User Equipment (UE), a Mobile Station (MS), a Mobile Terminal, a Mobile Subscriber Station (MSS) or the like. And, the AP includes the concept corresponding to one of a Base Station (BS), a Node-B, an evolved Node-B (eNB), a Base Transceiver System (BTS), a Femto BS and the like in other wireless communication fields.

Link Setup Process

Figure 5:
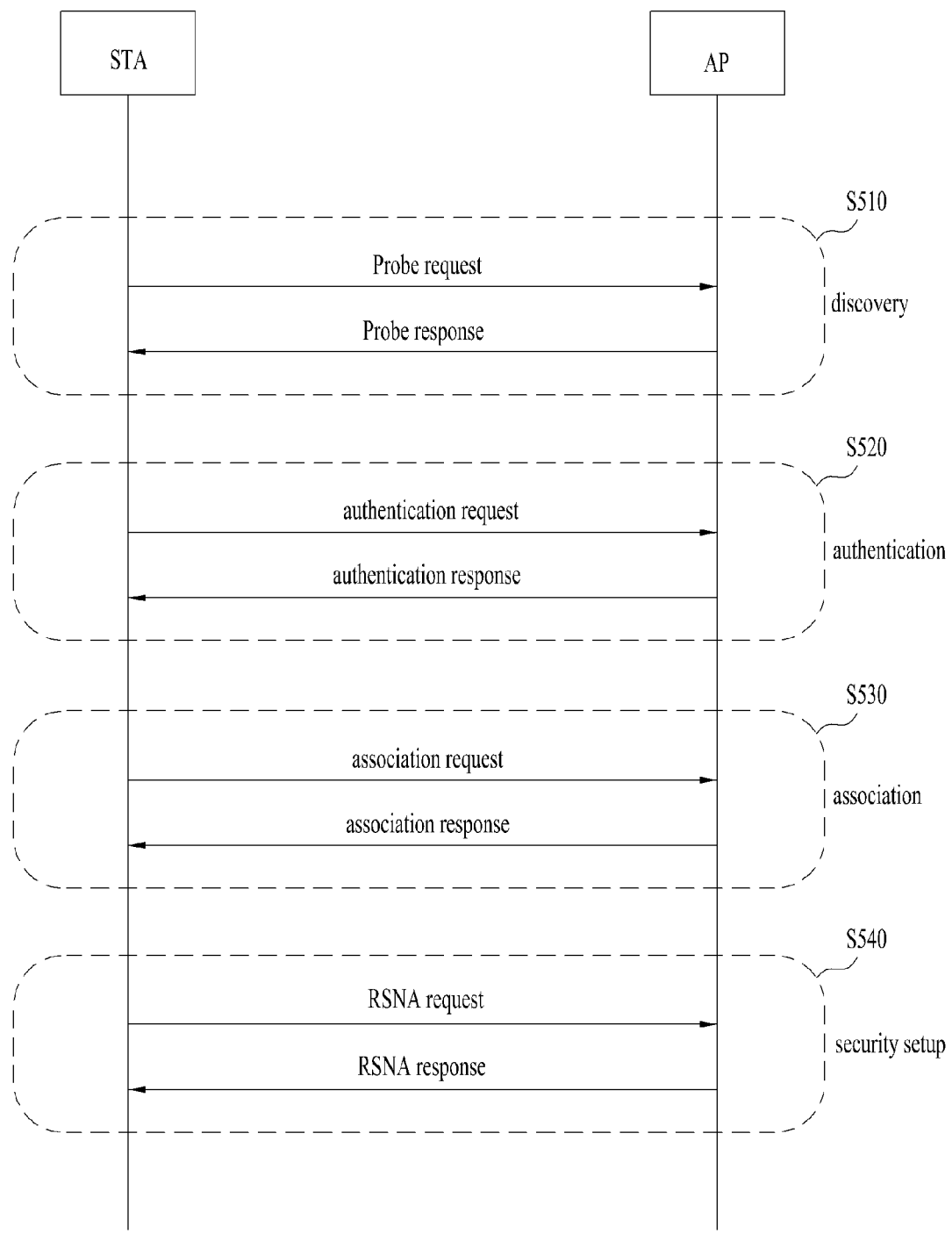
FIG. 5 is a diagram to describe a link setup process in a WLAN system.

FIG. 5 is a diagram to describe a general link setup process.

In order for an STA to transceive data by setting up a link with a network, the STA should discover a network, perform authentication, establish association, perform an authentication procedure for security, and the like. A link setup process can be named a session initiation process or a session setup process. And, the discovery, authentication, association and security setup steps of the link setup process can be commonly named an association process.

One example of a link setup process is described with reference to FIG. 5 as follows.

In a step S510, an STA can perform a network discovery action. The network discovery action can include a scanning action of the STA. In particular, in order to access the network, the STA should discover a joinable network. The STA needs to identify a compatible network before joining a wireless network. In doing so, a process for identifying a network existing in a specific area is called a scanning.

The scanning can be categorized into an active scanning or a passive scanning.

FIG. 5 shows a network discovery action including an active scanning process. In the active scanning, an STA performing a scanning transmits a probe request frame for searching what kind of AP exists nearby while switching channels and then waits for a response to the transmitted probe request frame. A responder transmits a probe response frame in response to the probe request frame to the STA having transmitted the probe request frame. In this case, the responder may include an STA having transmitted a beacon frame last in a BSS of a scanned channel. In the BSS, since an AP transmits the beacon frame, the AP becomes the responder. In IBSS, since each of STAs within the IBSS transmits the beacon frame in turn, the responder is not fixed. For instance, if an STA transmits a probe request frame on channel #1 and then receives a probe response frame on the channel #1, the STA saves BBS related information contained in the received probe response frame and is then able to perform a scanning in the same manner by switching to a next channel (e.g., channel #2) [i.e., transmission of a probe request on channel #2 and reception of a probe response on channel #2].

The scanning action may be performed by the passive scanning scheme [not shown in FIG. 5]. In the passive scanning, an STA performing the scanning waits for a beacon frame while switching channels. The beacon frame is one of management frames in IEEE 802.11 and is periodically transmitted in order to announce an existence of a wireless network and to enable an STA performing a scanning to discover and join the corresponding wireless network. In a BSS, an AP plays a role in transmitting a beacon frame periodically. In an IBSS, each of STAs within the IBSS transmits a beacon frame in turn. If an STA performing a scanning receives a beacon frame, the corresponding STA saves information on a BSS included in the beacon frame and then records a beacon frame information on each channel while switching to another channel. Having received the beacon frame, the STA saves a BSS related information contained in the received beacon frame and is then able to perform a scanning on a next channel by switching to the next channel.

Comparing an active scanning and a passive canning to each other, the active scanning is more advantageous than the passive scanning in delay and power consumption.

After the STA has discovered the network, an authentication process can be performed in a step S520. This authentication process can be named a first authentication process to be clearly discriminated from a security setup action in a step S540 described later.

The authentication process includes a following process. First of all, the STA transmits an authentication request frame to the AP. Secondly, the AP transmits an authentication response frame to the STA in response to the authentication request frame. The authentication frame used for the authentication request/response corresponds to a management frame.

The authentication frame can contain informations on an authentication algorithm number, an authentication transaction sequence number, a status code, a challenge text, an RSN (robust security network), a finite cyclic group, and the like. These informations correspond to some example of informations containable in the authentication request/response frame, can be substituted with other information, and may further include additional informations.

The STA can transmit an authentication request frame to the AP. Based on the information contained in the received authentication request frame, the AP can determine whether to allow the authentication of the corresponding STA. The AP is able to provide a result of the authentication processing to the STA through an authentication response frame.

After the STA has been successfully authenticated, an association process can be performed in a step S530. The association process includes a following process. First of all, the STA transmits an association request frame to the AP. Secondly, the AP transmits an association response frame to the STA in response to the association request frame.

For instance, the association request frame can include informations related to various capabilities, e.g., informations on a beacon listen interval, a service set identifier (SSID), supported rates, supported channels, an RSN, a mobility domain, supported operating classes, a TIM (traffic indication map) broadcast request, an interworking service capability and the like.

For instance, the association response frame can include informations related to various capabilities, e.g., informations on a status code, an AID (association ID), supported rates, an EDCA (enhanced distributed channel access) parameter set, an RCPI (received channel power indicator), an RSNI (received signal to noise indicator), a mobility domain, a timeout interval (association comeback time), an overlapping BSS scan parameter, a TIM broadcast response, a QoS (quality of service) map and the like.

These informations correspond to some example of informations containable in the authentication request/response frame, can be substituted with other information, and may further include additional informations.

After the STA has been successfully associated with the network, a security setup process can be performed in a step S540. The security setup process in the step S540 may be called an authentication process through RSNA (robust security network association) request/response. The authentication process of the step S520 may be named a first authentication process, while the security setup process of the step S540 may be simply named an authentication process.

The security setup process of the step S540 can include a private key setup process by 4-way handshaking through EAPOL (extensible authentication protocol over LAN) for example. And, the security setup process can be performed by a security scheme that is not defined in IEEE 802.11 Standard.

Evolution of WLAN

IEEE 802.11n exists as a technology standard stipulated relatively recently in order to overcome the limits put on a communication speed in a wireless LAN. The objects of IEEE 802.11n are to increase a speed and reliability of a network and to extend an operating distance of a wireless network. In particular, IEEE 802.11n supports high throughput (HT) of which data processing speed is equal to or greater than maximum 540 Mbps. In order to minimize transmission error and optimize a data speed or rate, IEEE 802.11n is based on MIMO (multiple inputs and multiple outputs) technology that uses multiple antennas for a transmitting unit end and a receiving end unit both.

As WLAN is supplied widely and actively and applications using WLAN are diversified, the necessity for a new WLAN system to support a throughput higher than a data processing speed supported by IEEE 802.11n is increasingly rising. A next generation WLAN system supportive of VHT (very high throughput) is a next version (e.g., IEEE 802.11ac) of IEEE 802.11n WLAN system and corresponds to one of IEEE 802.11 WLAN systems proposed recently and newly to support a data processing sped over 1 Gbps at a MAC service access point (SAP).

A next WLAN system supports a transmission of MU-MIMO (multi user multiple input multiple output) for enabling a plurality of STAs to access a channel simultaneously in order to efficiently use wireless channels. According to MU-MIMO transmission scheme, an AP is able to simultaneously transmit a packet to at least one or more MIMO-paired STAs.

And, there are ongoing discussions about supporting a WLAN system operation on a whitespace. For instance, the introduction of a WLAN system on a TV whitespace (ES) such as a frequency band (e.g., 54~698 MHz band) in idle state due to the digitalization of analog TV has been discussed as IEEE 802.11af Standard. Yet, this is just one example. The whitespace can be regarded as a licensed band that can be incumbently used by a licensed user. In this case, the licensed user means a user that is licensed to use a licensed band. And, the licensed user can be called one of a licensed device, a primary user, an incumbent user and the like.

For instance, an AP and/or STA operation on WS should provide a protection function for a licensed user. For instance, in case that a licensed user such as a microphone is already using a specific WS channel corresponding to a frequency band divided on regulation to have a specific bandwidth on a WS band, an AP and/or STA is unable to use the frequency band amounting to the corresponding WS channel to protect the licensed user. If a licensed user uses a frequency band currently used for a current frame transmission and/or reception, an AP and/or STA should stop using the corresponding frequency band.

Hence, the AP and/or STA should precedently perform a procedure for checking whether a use of a specific frequency band within a WS band is available, i.e., whether a licensed user exists on the frequency band. Checking whether the licensed user exists on the specific frequency band is called a spectrum sensing. As a spectrum sensing mechanism, one of energy detection, signature detection and the like is utilized. If a strength of a received signal is equal to or greater than a predetermined value, it is able to determine that the licensed user currently uses the specific frequency band. If a DTV preamble is detected, it is able to determine that the licensed user currently uses the specific frequency band.

M2M (machine-to-machine) communication technology is currently discussed as a next generation communication technology. In IEEE 802.11 WLAN system, a technology standard for supporting M2M communication is developed as IEEE 802.11ah. The M2M communication means a communication system that includes at least one machine and may be called MTC (machine type communication) or the like. In this case, 'machine' means an entity that does not require direct human manipulation or intervention. For instance, a device such as a wireless communication module installed meter and a wireless communication module installed auto vending machine may correspond to one example of a machine as well as a user device such as a smartphone that can perform a communication by automatically accessing a network without user's manipulation/intervention. The M2M communication can include one of a communication between devices (e.g., a D2D (device-to-device) communication), a communication between a device and a server (e.g., an application server), and the like. As one example of the device-to-server communication, there is a communication between an auto vending machine and a server, a communication between a POS (point of sale) device and a server, a communication between an electricity/gas/water meter and a server, or the like. Besides, M2M communication based applications can include security, transportation, health case and the like. Considering the properties of the application examples, M2M communication should be generally able to support transmission/reception of a small amount of data occasionally in an environment in which many devices exist.

In particular, M2M communication should be able to support a large number of STAs. Although a currently defined WLAN system assumes a case that maximum 207 STAs are associated with a single AP, methods for supporting a case that a number of STAs more than 2007 STAs are associated with a single AP are currently discussed in M2M communication. Moreover, in M2M communication, it is estimated that there will be many applications that support/require a low transmission speed. In order to support this smoothly, for instance, in WLAN system, an STA is able to recognize a presence or non-presence of data, which is to be transmitted to the STA, based on TIM (traffic indication map) element. And, methods for reducing a bitmap size of TIM are currently discussed. Moreover, in M2M communication, it is estimated that there will be many traffics that have a considerably long transmission/reception interval. For instance, like an electricity/gas/water used amount, it is required to transceive a considerably small amount of data in each long periodicity (e.g., 1 month, etc.). moreover, in M2M communication, since operation of STA is performed in response to a command provided in downlink (i.e., link from AP to non-AP STA) and data is then reported in uplink (i.e., link from no-AP STA to AP) as a result of the operation, enhanced communication schemes in uplink for transmitting primary data are mainly handled. Moreover, since M2M STA mainly operates by battery and a user has difficulty in frequently charging the M2M STA, it is necessary to secure a long life by minimizing battery consumption. Moreover, since it is expected that a user may have difficulty in directly manipulating the M2M STA in a specific situation, it is necessary for the M2M STA to have a self-recovering function. Hence, although the number of STAs associable with a single AP increases highly, methods for efficiently supporting a case that the number of STAs having a data frame supposed to be received from an AP in a single beacon periodicity is considerably small are currently discussed.

Thus, the WLAN technology is evolving fast and technologies for a direct link setup, an enhancement of media streaming performance, support of a fast and/or large-scale initial session setup, support of an extended bandwidth and operating frequency, and the like are currently developed.

WLAN Operational Below 1 GHz (Sub-1 GHz)

As mentioned in the foregoing description, ongoing discussions are made on IEEE 802.11ah standard of which use case is M2M communication. The IEEE 802.11ah standard operates on an unlicensed band except TV a TV white space band in an operating frequency below 1 GHz (sub-1 GHz) and can provide a coverage (e.g., maximum 1 km) considerably wider than that of WLAN mainly supportive of an existing indoor coverage. In particular, unlike the WLAN operational on the existing frequency of 2.4 GHz or 5 GHz, if WLAN is used on sub-1 GHz (e.g., 700~900 MHz) operating frequency band, a coverage of an AP over the same transmission power is extended about 2~3 times owing to the propagation property of the corresponding band. In this case, it is characterized in that a considerably large number of APs can access each AP. The use cases considered by the IEEE 802.11ah standard are summarized as Table 1 in the following.

TABLE 1

| Use Case 1: Sensors and meters |
|---|
| 1a: Smart Grid - Meter to Pole |
| 1c: Environmental/Agricultural Monitoring |
| 1d: Industrial process sensors |
| 1e: Healthcare |
| 1f: Healthcare |
| 1g: Home/Building Automation |
| 1h: Home sensors |
| Use Case 2: Backhaul Sensor and meter data |
| Backhaul aggregation of sensors |
| Backhaul aggregation of industrial sensors |
| Use Case 3: Extended range Wi-Fi |
| Outdoor extended range hotspot |
| Outdoor Wi-Fi for cellular traffic offloading |

According to Use Case 1 of Table 1, various kinds of sensor/meter devices can perform M2M communications by accessing 802.11ah AP. In particular, in case of a smart grid, maximum 6,000 sensor/meter devices can access a single AP.

According to Use Case 2 of Table 1, the 802.11ah AP capable of providing a wide coverage plays a role as a backhaul link of another system such as IEEE 802.15.4g.

According to Use Case 3 of Table 1, an extended home coverage, a campus wide coverage, and an outdoor extended range hotspot communication (for shopping mall, etc.) can be supported. Moreover, according to Use Case 3, as 802.11ah AP supports traffic offloading of a cellular mobile communication, it is able to play a role in distributing overload of cellular traffic.

The physical layer (PHY) configuration of the communications on the above-mentioned sub-1 GHz band can be implemented by $1/10$ down-clocking 802.11ac PHY. In this case, 20/40/80/160/80+80 MHz channel bandwidth in 802.11ac can provide 2/4/8/16/8+8 MHz channel bandwidth on sub-1 GHz band through $1/10$ down-clocking. Hence, a guard interval (GI) is increased 10 times from 0.8 μs to 8 μs. Table 2 in the following shows throughput comparisons between 802.11ac PHY and $1/10$ down-clocked sub-1 GHz PHY.

TABLE 2

| IEEE 802.11ac PHY Channel Bandwidth/Throughput | $1/10$ down-clocked sub-1 GHz PRY Channel Bandwidth/Throughput |
|---|---|
| 20 MHz/86.7 Mbps | 2 MHz/8.67 Mbps |
| 40 MHz/200 Mbps | 4 MHz/20 Mbps |
| 80 MHz/433.3 Mbps | 8 MHz/43.33 Mbps |
| 160 MHz/866.7 Mbps | 16 MHz/86.67 Mbps |
| 80 + 80 MHz/866.6 Mbps | 8 + 8 MHz/86.66 Mbps |

Medium Access Mechanism

In WLAN system according to IEEE 802.11, a basic access mechanism of MAC (medium access control) is a CSMA/CA (carrier sense multiple access with collision avoidance) mechanism. The CSMA/CA mechanism may be called DCF (distributed coordination function) of IEEE 802.11 MAC and basically employees an access mechanism 'listen before talk'. According to an access mechanism of such a type, before initiating a transmission, an AP and/or STA can perform CCA (clear channel assessment) for sensing a radio channel or medium during a prescribed time interval (e.g., DIFS (DCF inter-frame space). As a result of the sensing, if it is determined that a medium is in idle status, the AP and/or STA starts a frame transmission through a corresponding medium. On the contrary, if it is detected that a medium is in occupied status, the corresponding AP and/or STA sets up a delay interval (e.g., a random backoff period) for a medium access instead of starting its own transmission, stands by, and is then able to attempt a frame transmission. Since several STAs are expected to attempt frame transmission after standbys for different times owing to the application of the random backoff period, it is able to minimize collision.

IEEE 802.11 MAC protocol provides HCF (hybrid coordination function). The HCF is based on the DCF and PCF (point coordination function). The PCF corresponds to a polling-based synchronous access scheme and means a scheme of performing polling periodically in order for all receiving APs and/or STAs to receive data frame. The HCF has EDCA (enhanced distributed channel access) and HCCA (HCF controlled channel access). The EDCA uses a contention based access scheme for a provider to provide a data frame to multiple users. And, the HCCA uses a non-contention based channel access scheme using a polling mechanism. Moreover, the HCF includes a medium access mechanism for improving QoS (quality of service) of WLAN and is able to transmit QoS data in both a contention period (CP) and a contention free period (CFP).

Figure 6:
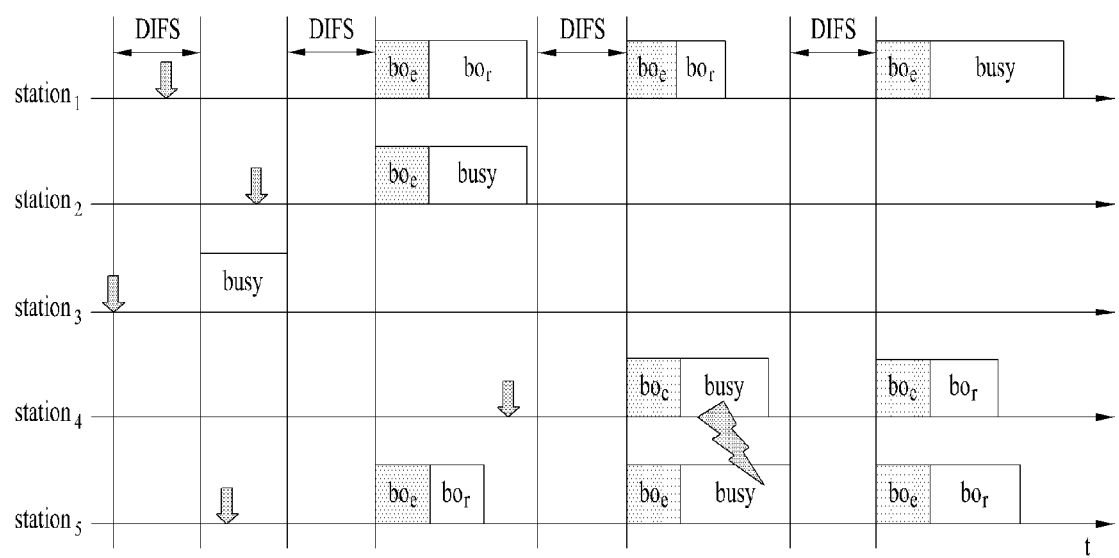
FIG. 6 is a diagram to describe a back-off process.

FIG. 6 is a diagram to describe a backoff process.

An operation based on a random backoff period is described with reference to FIG. 6 as follows. First of all, if a medium in occupied or busy status enters an idle status, several STAs can attempt data (or frame) transmission. In doing so, according to a scheme of minimizing collision, each of the STAs selects a random backoff count, stands by in a slot time amounting to the selected random backoff count, and is then able to attempt the transmission. The random backoff count has a pseudo-random integer value and can be determined as 0 or one of values in a CW range. In this case, the CW is a contention window parameter value. CWmin is given as an initial value to the CW parameter. Yet, if the transmission fails [e.g., ACK for a transmitted frame is not received], the CW parameter can take a doubled value. If the CW parameter value becomes CWmax, the data transmission can be attempted by maintaining the CWmax value until the data transmission becomes successful. If the data transmission is successfully completed, the CW parameter value is rest to the CWmin value. Preferably, a value of each of the CW, CWmin and CWmax is set to $(2^n-1)$, where $n=0, 1, 2 \ldots$.

If a random backoff process starts, the STA keeps monitoring a medium while a backoff slot is counted down according to the determined backoff count value. If the STA monitors that the medium is in a busy status, the STA waits by stopping the countdown. If the medium enters the idle status, the STA resumes the remaining countdown.

In the example shown in FIG. 6, in case that a packet to be transmitted arrives at the MAC of STA3, the STA3 confirms that the medium is in idle status and is then able to directly transmit a frame. Meanwhile, the rest of the STAs monitor that the medium is in busy status and stands by. In doing so, since data to be transmitted may be generated from each of STA1, STA2 and STA5, each of the STAs stands by for DIFS if monitoring that the medium is in idle status and is then able to count down a backoff slot according to a random backoff count value selected by itself. In the example shown in FIG. 6, the STA2 selects a smallest backoff count value and the STA1 selects a biggest backoff count value. In particular, FIG. 6 shows one example that a residual backoff time of the STA5 is shorter than that of the STA1 at the timing point at which the STA2 finishes the backoff count and starts a frame transmission. Each of the STA1 and the STA5 stops the countdown temporarily and stands by, while the STA2 occupies the medium. As the occupation by the STA2 is ended, if the medium enters the idle status again, each of the STA1 and the STA5 stands by for DIFS and then resumes the paused backoff count. In particular, the frame transmission can be started after the rest of backoff slots amounting to the residual backoff time have been counted down. Since the residual backoff time of the STA5 is shorter than that of the STA1, the STA5 starts the frame transmission. Meanwhile, while the STA2 occupies the medium, data can be generated from the STA4. In doing so, from the viewpoint of the STA4, if the idle enters an idle status, the STA4 stands by for DIFS, performs a countdown according to a random backoff count value selected by itself, and is then able to start a frame transmission. FIG. 6 shows one example of a case that a residual backoff time of the STA5 accidently coincides with a random backoff count value of the STA4. In this case, collision may occur between the STA4 and the STA5. In case that the collision occurs, each of the STA4 and the STA5 is unable to receive ACK and fails in the data transmission. In this case, each of the STA4 and the STA5 doubles a CW value, selects a random backoff count value, and is then able to perform a countdown. Meanwhile, the STA1 stands by while the medium is in the occupied (or busy) status due to the transmissions by the STA4 and the STA5. If the medium enters an idle status, the STA1 stands by for DIFS. If the residual backoff time elapses, the STA1 is able to start the frame transmission.

Sensing Operation of STA

As mentioned in the foregoing description, the CSMA/CA mechanism includes a virtual carrier sensing as well as a physical carrier sensing for an AP and/or STA to directly sense a medium. The virtual carrier sensing is provided to complement such a problem, which may be generated from a medium access, as a hidden node problem and the like. For the virtual carrier sensing, MAC of WLAN system is able to use a network allocation vector (NAV). The NAV is a value for an AP and/or STA currently using a medium or having an authority to use to indicate a time, which is left until a medium enters an available status, to another AP and/or STA. Hence, the value set as the NAV corresponds to a period scheduled for an AP and/or STA transmitting a corresponding frame to use a medium. If an STA receives the NAV value, the STA is prohibited from a medium access during the corresponding period. For instance, the NAV can be set according to a value of a 'duration' field of a MAC header of a frame.

Moreover, in order to reduce possibility of collision, a robust collision detecting mechanism has been introduced. This shall be described with reference to FIG. 7 and FIG. 8. Although a carrier sensing range and a carrier transmission range may not be actually identical to each other, assume that the two ranges are identical to each other for clarity of the following description.

FIG. 7 is a diagram to describe a hidden node and an exposed node.

FIG. 7 (a) shows one example of a hidden node, which corresponds to a case that STA C has information to transmit in the course of a communication between STA A and STA B. In particular, despite a situation that the STA is transmitting information to the STA B, the STA C can determine that a medium is in idle status when the STA C performs a carrier sensing before sending data to the STA B. The reason for this is that a transmission (i.e., a medium occupation) by the STA A may not be sensed at a location of the STA C. In this case, since the STA B receives both information of the STA A and information of the STA C simultaneously, a collision occurs. In doing so, the STA A can be called a hidden node of the STA C.

FIG. 7 (b) shows one example of an exposed node, which corresponds to a case that STA C has information to transmit to STA D in a situation that STA B is transmitting data to STA A. In doing so, if the STA C performs a carrier sensing, it is able to determine that a medium is occupied due to the transmission by the STA B. Hence, although the STA C has the information to transmit to the STA D, since the medium occupied status is sensed, the STA C should stand by until the medium enters an idle status. Yet, since the STA A is actually located out of a transmission range of the STA C, the transmission from the STA C and the transmission from the STA B may not collide with each other from the viewpoint of the STA A, the STA C may stand by unnecessarily until the STA B stops the transmission. In doing so, the STA C can be called an exposed node of the STA B.

Figure 8:
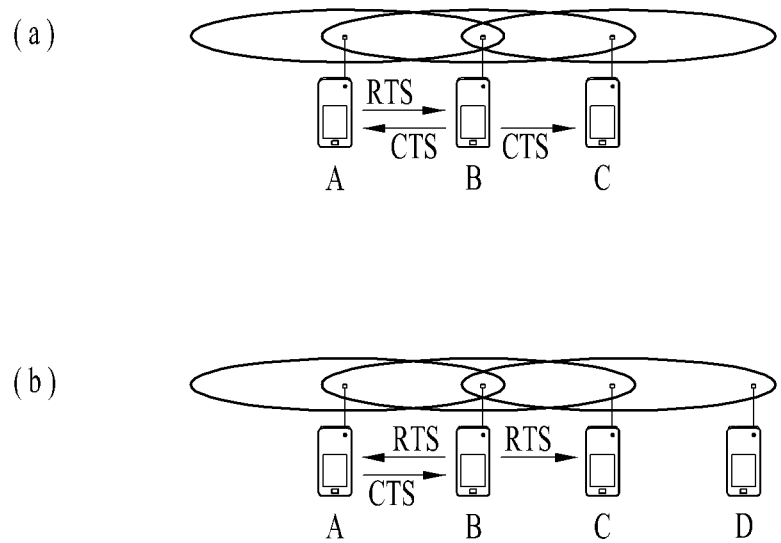
FIG. 8 is a diagram to describe RTS and CTS.

FIG. 8 is a diagram to describe RTS and CTS.

First of all, in order to efficiently use a collision avoidance mechanism in the exemplary situation shown in FIG. 7, it is able to use such a short signaling packet as RTS (request to send), CTS (clear to send) and the like. In order to enable neighbor STA(s) to overhear, RTS/CTS between two STAs can be set to enable the neighbor STA(s) to consider whether to perform information transmission between the two STAs. For instance, if a data transmitting STA transmits an RTS frame to a data receiving STA, the data receiving STA is able to announce that it will receive data by transmitting a CTS frame to neighbor user equipments.

FIG. 8 (a) shows one example of a method of solving a hidden node problem, which assumes a case that both STA A and STA C intend to transmit data to STA B. if the STA A sends RTS to the STA B, the STA B transmits CTS to both of the STA A and the STA C neighboring to the STA B. As a result, the STA C stands by until the data transmission between the STA A and the STA B ends, whereby collision can be avoided.

FIG. 8 (b) shows one example of a method of solving an exposed node problem. As STA C overhears RTS/CTS transmission between STA A and STA B, the STA C can determine that collision will not occur despite that the STA C transmits data to another STA (e.g., STA D). In particular, the STA B transmits RTS to all neighbor user equipments and the STA A having data to send actually transmits CTS only. Since the STA C receives the RTS but fails in receiving the CTS of the STA A, the STA C can recognize that the STA A is out of a carrier sensing of the STA C.

Power Management

As mentioned in the foregoing description, in WLAN system, STA should perform a channel sensing before performing transmission/reception. Yet, sensing a channel all the time requires a consistent power consumption of the STA. there is no big difference between a power consumption in reception status and a power consumption in transmission status. And, keeping the reception status puts a burden on a power-limited STA (i.e., a battery-operable STA). Hence, if an STA maintains a reception standby status in order to consistently sense a channel, it consumes a power inefficiently without special advantages in aspect of WLAN throughput. In order to solve this problem, a WLAN system supports a power management (PM) mode of STA.

The power management mode of STA can be divided into an active mode and a power save mode. The STA basically operates in active mode. The STA operating in active mode maintains an awake state. The awake state means a state in which a normal operation such as a frame transceiving, a channel scanning and the like is possible. On the other hand, the STA operating in PS mode operates in a manner of switching between a sleep state and an awake state. The STA operating in sleep state operates with a minimum power but does not perform a channel scanning as well as a frame transceiving.

Since a power consumption decreases if an STA operates in sleep state as long as possible, an operating period of the STA increases. Yet, since a frame transceiving is impossible in the sleep state, the STA is unable to operate long unconditionally. If there is a frame an STA operating in sleep state will transmit to an AP, the STA can transmit a frame by switching to an awake state. On the contrary, if there is no frame the AP will transmit to the STA, the STA in the sleep state is unable to receive the frame and is also unable to recognize a presence of the frame to receive. Hence, the STA may need an operation of switching to an awake state in accordance with specific periodicity in order to recognize a presence or non-presence of a frame to be transmitted to the corresponding STA (or, in order to receive the frame if the frame is present).

Figure 9:
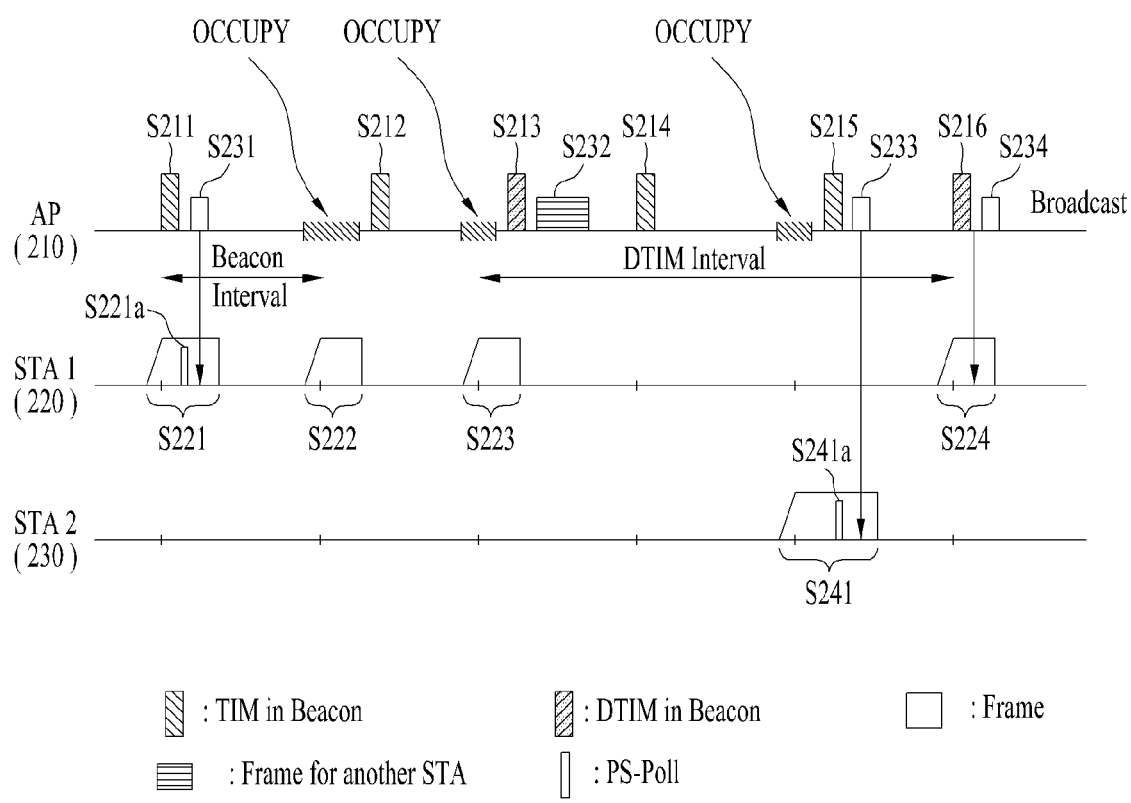
FIG. 9 is a diagram to describe a power management operation.

FIG. 9 is a diagram to describe a power management operation.

Referring to FIG. 9, an AP 210 transmits beacon frames to STAs in a BSS by predetermined periods [S211, S212, S213, S214, S215, and S216]. In the beacon frame, a TIM (traffic indication map) information element is contained. The TIM information element contains information for the AP 210 to indicate that there is a buffered traffic for STAs associated with the AP 210 and that the AP 210 will transmit a frame. TIM element may include a TIM used to indicate a unicast frame and a DTIM (delivery traffic indication map) used to indicate a multicast or broadcast frame.

The AP 210 can transmit the DTIM once per 3 transmissions of the beacon frames. STA1 220 and STA2 230 are STAs that operational in PS mode. Each of the STA1 220 and the STA2 230 can be set to receive the TIM element transmitted by the AP 210 by switching to an awake state from a sleep state in every wakeup interval of prescribed periodicity. Each of the STAs can calculate a timing point of switching to an awake state based on its local clock. In the example shown in FIG. 9, assume that the clock of the STA coincides with a clock of the AP.

For instance, the prescribed wakeup interval can be set for the STA1 220 to receive the TIM element by switching to the awake state in every beacon interval. Hence, when the AP 210 transmits the beacon frame for the $1^{st}$ time [S211], the STA1 220 can switch to the awake state [S221]. The STA1 220 receives the beacon frame and is able to acquire the TIM element. If the acquired TIM element indicates that there is a frame to be transmitted to the STA1 220, the STA1 220 can transmit a PS-Poll (Power Save-Poll) frame, which is provided to make a request for a frame transmission to the AP 210, to the AP 210 [S221a]. The AP 210 is able to transmit a frame to the STA1 220 in response to the PS-Poll frame [S231]. Having received the frame, the STA1 220 operates by switching to the sleep state again.

When the AP 210 transmits the beacon frame for the $2^{nd}$ time, since a medium is occupied (i.e., the medium is a busy medium) in a manner that another device accesses the medium for example, the AP 210 is unable to transmit the beacon frame to correspond to an accurate beacon interval but is able to transmit the beacon frame at a delayed timing point [S212]. In this case, although the STA1 220 switches its operating mode to the awake state to correspond to the beacon interval, since the STA1 220 fails in receiving the beacon frame transmitted by being delayed, the STA1 220 switches to the sleep state again [S222].

When the AP 210 transmits the beacon frame for the 3$^{rd}$ time, TIM element set as DTIM may be contained in the corresponding beacon frame. Yet, since the medium is occupied (i.e., the medium is a busy medium), the AP 210 transmits a delayed beacon frame [S213]. The STA1 220 operates by switching to the awake state to correspond to the beacon interval and is able to acquire DTIM through the beacon frame transmitted by the AP 210. The DTIM acquired by the STA1 220 is assumed as indicating that there is no frame to be transmitted to the STA1 220 and that a frame for another STA is present. In this case, the STA1 220 confirms that there is no frame to receive and is then able to operate by switching to the sleep state again. After transmitting the beacon frame, the AP 210 transmits a frame to the corresponding STA [S232].

The AP 210 transmits the beacon frame for the 4$^{th}$ time [S214]. Yet, since the STA1 220 is unable to acquire information, which indicates that a buffered traffic for the STA1 220 is present, through the two previous TIM element receptions, the STA1 220 is able to adjust a wakeup interval for the TIM element reception. On the other hand, if a signaling information for adjusting a wakeup interval value of the STA1 220 is contained in the beacon frame transmitted by the AP 210, the wakeup interval value of the STA1 can be adjusted. According to the present example, the STA1 220 can be set to switch an operating state in a manner that the STA1 220 wakes up once in every 3 beacon intervals instead of switching the operating state for the TIM element reception in every beacon interval. Hence, since the STA1 220 maintains the sleep state at the timing point at which the AP 210 transmits the beacon frame for the 5$^{th}$ time [S215] after transmitting the 4$^{th}$ beacon frame [S214], the STA1 220 is unable to acquire the corresponding TIM element.

When the AP 210 transmits the beacon frame for the 6$^{th}$ time [S216], the STA1 220 operates by switching to the awake state and is able to acquire the TIM element contained in the beacon frame [S224]. Since the TIM element is the DTIM that indicates that a broadcast frame is present, the STA1 220 does not transmit a PS-Poll frame to the AP 210 but is able to receive a broadcast frame transmitted by the AP 210 [S234]. Meanwhile, a wakeup interval set for the STA2 230 can be set to have a period longer than that of the STA1 220. Hence, the STA2 230 can receive the TIM element by switching to the awake state at the timing point S215 at which the AP 210 transmits the beacon frame for the 5$^{th}$ time [S241]. The STA2 230 recognizes that a frame to be transmitted to the STA2 230 is present from the TIM element and is then able to transmit a PS-Poll frame to the AP 210 to request a frame transmission [S241a]. Finally, the AP 210 is able to transmit a frame to the STA2 230 in response to the PS-Poll frame [S233].

For the power save mode management shown in FIG. 9, TIM element contains TIM indicating whether a frame to be transmitted to STA is present or DTIM indicating whether a broadcast/multicast frame is present. And, the DTIM can be implemented through a field setup of the TIM element.

Figure 10:
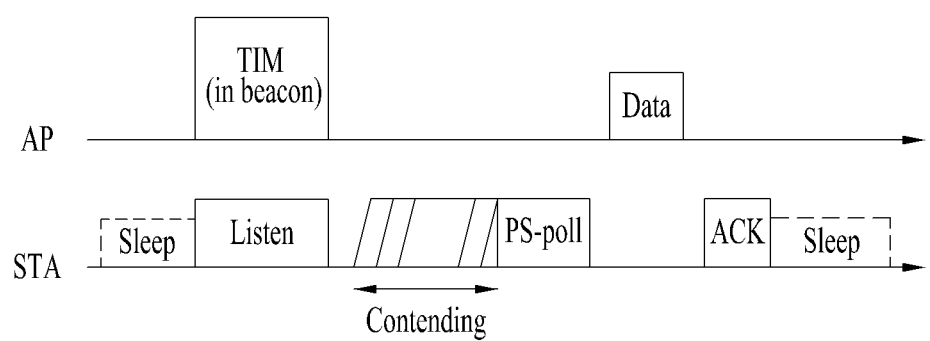
FIGS. 10 to 12 are diagrams to describe operations of an STA having received TIM in detail.
Figure 11:
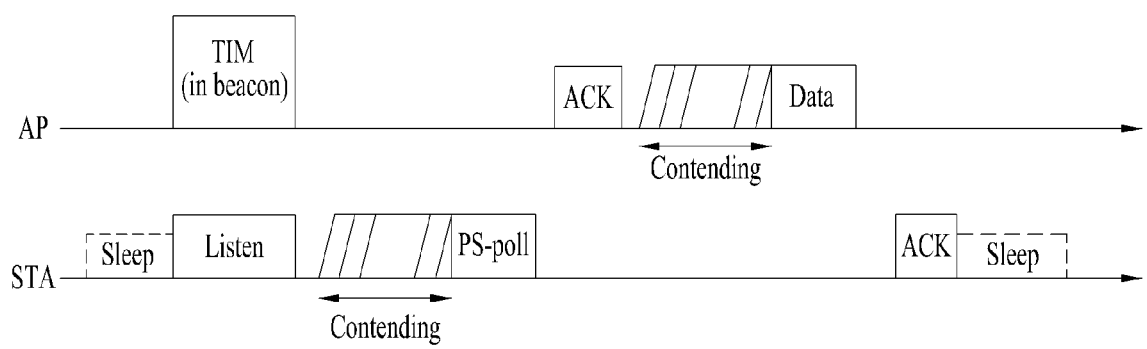
Figure 12:
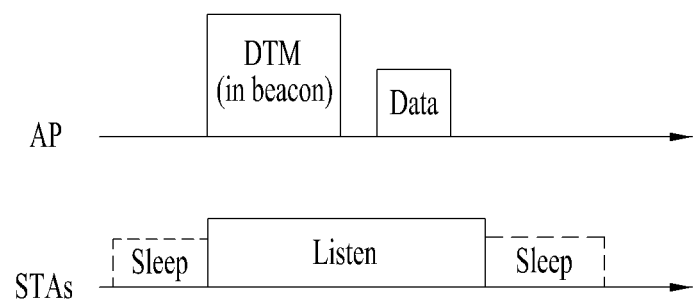

FIGS. 10 to 12 are diagrams to describe operations of an STA having received TIM in detail.

Referring to FIG. 10, an STA switches to an awake state from a sleep state in order to receive a beacon frame containing a TIM from an AP and is then able to recognize that there is a buffered traffic to be transmitted to the STA by interpreting the received TIM element. The STA performs contention with other STAs for a medium access for a PS-Poll frame transmission and is then able to transmit a PS-Poll frame to make a request for a data frame transmission to the AP. Having received the PS-Poll frame transmitted by the STA, the AP is able to transmit a frame to the STA. The STA receives a data frame and is then able to transmit an ACK frame to the AP in response to the received data frame. Thereafter, the STA can switch to the sleep state again.

Like the example shown in FIG. 10, an AP can operate by an immediate response scheme in a manner of receiving a PS-Poll frame from an STA and then transmitting a data frame after a lapse of a prescribed time (e.g., SIFS (short inter-frame space). Meanwhile, after the AP has received the PS-Poll frame, if the AP fails to prepare the data frame, which is to be transmitted to the STA, within the SIFS time, the AP is able to operate by a deferred response scheme. This is described with reference to FIG. 11 as follows.

In an example shown in FIG. 11, like the former example shown in FIG. 10, an STA operates in a manner of switching to an awake state from a sleep state, receiving a TIM from an AP, and then transmitting a PS-Poll frame to the AP. If the AP fails to prepare a data frame during SIFS despite receiving the PS-Poll frame, the AP is able to transmit an ACK frame to the STA instead of transmitting the data frame. If the AP prepares the data frame after transmitting the ACK frame, the AP performs a contending and is then able to transmit the data frame to the STA. Subsequently, the STA transmits an ACK frame, which indicates that the data frame is successfully received, to the AP and is then able to switch to the sleep state.

FIG. 12 shows one example that an AP transmits a DTIM. Each of STAs can switch to an awake state from a sleep state in order to receive a beacon frame containing a DTIM element from an AP. Each of the STAs can be aware that a multicast/broadcast frame will be transmitted through the received DTIM. After the AP has transmitted the beacon frame containing the DTIM, the AP is able to immediately transmit data (i.e., multicast/broadcast frame) without a PS-Poll frame transceiving operation. Each of the STAs receives the data in the course of keeping the awake state after receiving the beacon frame containing the DTIM and is then able to switch to the sleep state again after completion of the data reception.

TIM Structure

In a power save mode managing method based on TIM (or DTIM) protocol described with reference to one of FIGS. 9 to 12, each of STAs can check whether a data frame, which will be transmitted for the corresponding STA, is present through STA identification information contained in TIM element. The STA identification information may include information related to an AID (association identifier) assigned to the STA in the course of association with an AP.

The AID is used as a unique identifier for each STA in a single BSS. For instance, in a current WLAN system, the AID can be assigned as one of values ranging 1 to 2,007. In a currently defined WLAN system, 14 bits can be assigned to AID in a frame transmitted by an AP and/or STA and an AID value can be set to a value up to 16,383. Yet, 2,008 to 16,383 are set as reserved values.

TIM element according to an existing definition is not appropriate for applying an M2M application for associating a number of STAs (e.g., over 2,007 STAs) with a single AP. In case of extending an existing TIM structure as it is, since a TIM bitmap size increases to large, it cannot be supported by an existing frame format and is not appropriate for an M2M communication that considers an application of a low transmission rate. And, in the M2M communication, it is estimated that the number of STAs having a received data frame present in a single beacon period will be very small. Hence, considering the application example of the M2M communication, although a size of a TIM bitmap increases, since it is estimated that most of bits will have zero values frequently, a technology of compressing a bitmap efficiently is required.

As an existing bitmap compression technology, a method of defining an offset (or start point) value by omitting contiguous zeroes in a head part of a bitmap is prepared. Yet, although the number of STAs having buffered frames is small, if an AID value difference of each STA is big, compression efficiency is not high. For instance, in case that a frame, which is to be transmitted to two STAs respectively having AIDs set to 10 and 2,000, is buffered only, although a compressed bitmap has a length of 1,990, it has all zero values except both ends. In case that the number of STAs associable with a single AP is small, inefficiency of bitmap compression is not a big problem. Yet, if the number of STAs increases, such inefficiency may become a factor of degrading overall system performance.

In order to solve such a problem, data transmission can be performed effectively in a manner of dividing AID into several groups. In this case, a designated group ID (GID) is assigned to each of the groups. The AID assigned on the basis of group is described with reference to FIG. 13 as follows.

Figure 13:
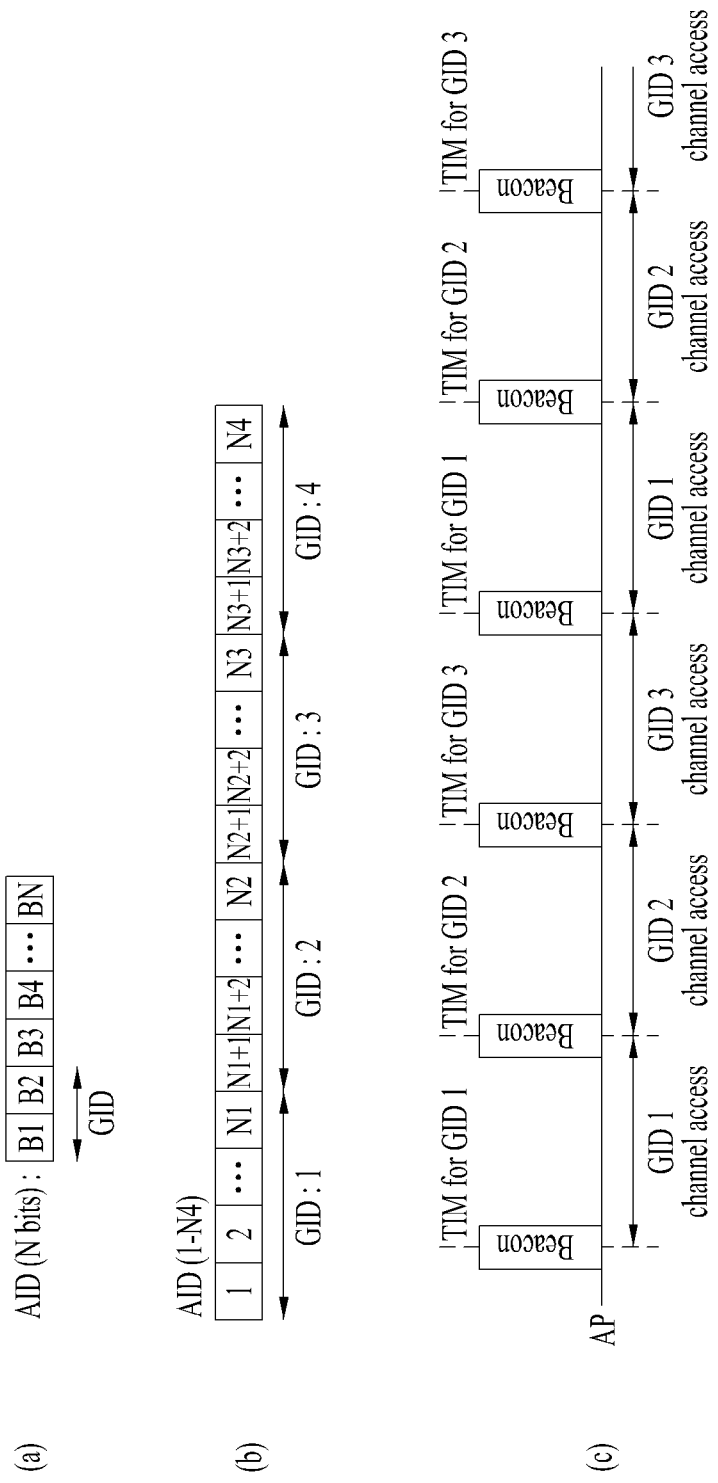
FIG. 13 is a diagram to describe a group based AID.

FIG. 13 (a) shows one example of AID assigned on the basis of group. In the example shown in FIG. 13 (a), several bits in a head part of AID bitmap can be used to indicate GID. For instance, it is able to indicate 4 GIDs using first 2 bits of the AID bitmap. If a total length of the AID bitmap is N bits, first 2 bits B1 and B2 indicate a GID of a corresponding AID.

FIG. 13 (b) shows another example of AID assigned on the basis of group. In the example shown in FIG. 13 (b), a GID can be assigned in accordance with a location of an AID. In this case, AIDs using the same GID can be represented as offset and length values. For instance, if GID 1 is represented as offset A and length B, it means that AIDs of A to (A+B−1) have GID 1 on a bitmap. For instance, in the example shown in FIG. 13 (b), assume that all AIDs 1 to N4 are divided into 4 groups. In this case, AIDs belonging to GID 1 are 1 to N1. And, the AIDs belonging to this group can be represented as offset 1 and length N1. AIDs belonging to GID 2 can be represented as offset (N1+1) and length (N2−N1+1). AIDs belonging to GID 3 can be represented as offset (N2+1) and length (N3−N2+1). AIDs belonging to GID 4 can be represented as offset (N3+1) and length (N4−N3+1).

If such a group-basis assigned AID is employed, a channel access is allowed in a time interval differing according to GID. Therefore, a shortage problem of TIM elements for a number of STAs can be solved and data can be efficiently transceived. For instance, a channel access is allowed for STA(s) corresponding to a specific group in a specific time interval, while the rest of STA(s) may be restricted from the channel access. Thus, a prescribed time interval for allowing an access for specific STA(s) only may be named a restricted access window (RAW).

A channel access according to GID is described with reference to FIG. 13 (c) as follows. FIG. 13 (c) shows one example of a channel access mechanism according to a beacon interval in case that AID is divided into 3 groups. A $1^{st}$ beacon interval (or a $1^{st}$ RAW) is an interval that allows a channel access for an STA corresponding to an AID belonging to GID 1 but does not allow a channel access for STAs belonging to other GIDs. In order to implement this, TIM element for AIDs corresponding to the GID1 only is contained in a $1^{st}$ beacon. TIM element for AIDs having GID 2 only is contained in a $2^{nd}$ beacon frame. Hence, a channel access of an STA corresponding to the AID belonging to the GID 2 is allowed in a $2^{nd}$ beacon interval (or a $2^{nd}$ RAW) only. TIM element for AIDs having GID 3 only is contained in a $3^{rd}$ beacon frame. Hence, a channel access of an STA corresponding to the AID belonging to the GID 3 is allowed in a $3^{rd}$ beacon interval (or a $3^{rd}$ RAW) only. The TIM element for AIDs having GID 1 only is contained in a $4^{th}$ beacon frame again. Hence, a channel access of an STA corresponding to the AID belonging to the GID 1 is allowed in a $4^{th}$ beacon interval (or a $4^{th}$ RAW) only. Subsequently, in each of the following beacon intervals including a $5^{th}$ beacon interval (or a $5^{th}$ RAW), a channel access may be allowed only for STA belonging to a specific group indicated by a TIM contained in a corresponding beacon frame.

FIG. 13 (c) shows one example that an order of GID allowed according to a beacon interval is cyclic or periodic, by which the GID order is non-limited. In particular, an operation can be performed in a following manner. First of all, in a manner that AID(s) belonging to specific GID(s) is contained in a TIM element, a channel access is allowed only for STA(s) corresponding to the specific AID(s) in a specific time interval (e.g., a specific RAW) while the channel access is not allowed for the rest of STA(s).

The group based AID assignment system mentioned in the above description may be named a hierarchical structure of TIM. In particular, a whole AID space is divided into a plurality of blocks and a channel access may be allowed only for STA(s) (i.e., STA of a specific group) corresponding to a specific block having a non-zero value. Hence, an STA can easily maintain TIM information by dividing a TIM in large size into small blocks/groups and the management of the blocks/groups in accordance with a class, QoS (quality of service) or usage of STA is facilitated. In the example shown in FIG. 13, 2-level layer is illustrated. Yet, it is able to configure a TIM of a hierarchical structure having at least two or more levels. For instance, a whole AID space is divided into a plurality of page groups, each of the page groups is divided into a plurality of blocks, and each of the locks can be divided into a plurality of subblocks. In this case, as an extension of the example shown in FIG. 13 (a), an AID bitmap can be configured in a following manner. First of all, first N1 bits indicate a page ID (i.e., PID), next N2 bits indicate a block ID, next N3 bits indicate a subblock ID, and the rest of bits indicate an STA bit location in a subblock.

To examples of the present invention mentioned in the following description, various methods of dividing STAs (or AIDs respectively assigned to STAs) by prescribed hierarchical group unit and managing the STAs are applicable, by which the group based AID assignment method may be non-limited.

PPDU Frame Format

PPDU (Physical Layer Convergence Protocol (PLCP) Packet Data Unit) frame format can be configured in a manner of containing STF (Short Training Field), LTF (Long Training Field), SIG (SIGNAL) field and Data field. The most basic PPDU frame format (e.g., non-HT (High Throughput) PPDU frame format) can be configured with L-STF (Legacy-STF), L-LTF (Legacy-LTF), SIG field and data field only. Moreover, according to a type (e.g., HT-mixed format PPDU, HT-greenfield format PPDU, VHT (Very High Throughput) PPDU, etc.) of PPDU frame format, additional (or different type) STF, LTF and SIG field can be included between the SIG field and the data field.

The STF is a signal for signal detection, AGC (Automatic Gain Control), diversity selection, precise time synchronization and the like. And, the LTF is a signal for channel estimation, frequency error estimation and the like. The STF and LTF can combined to be named PCLP preamble. And, the PCLP preamble may be a signal for synchronization of PFDM physical layer and channel estimation.

The SIG field can include RATE field, LENGTH field and the like. The RATE field can include information on modulation and coding rate of data. The LENGTH field can include information on a length of data. Additionally, the SIG field can include parity bit, SIG TAIL bit and the like.

The data field can include SERVICE field, PSDU (PLCP Service Data Unit), and PPDU TAIL bit. And, the data field can further include padding bits if necessary. A prescribed bit portion of the SERVICE field can be used for synchronization of a descrambler in a receiving end. The PSDU corresponds to MAC PDU (i.e., MPDU) defined in MAC layer and can include data created from or used by an upper layer. The PPDU TAIL bit can be used to make an encoder to return to z zero state. The padding bit can be used to match a length of the data field to prescribed unit(s).

The MPDU is defined in accordance with various MAC frame formats. A basic MAC frame is configured with MAC header, frame body and FCS (frame check sequence). The MAC frame is configured with MPDU and can be transmitted/received through PSDU of a data part of the PPDU frame format.

Meanwhile, the null-data packet (NDP) frame format means a frame format in configuration of not including data packet. In particular, the NDP frame means a frame format which includes a PLCP header part (e.g., STF, LTF and SIG field) of a general PPDU format without including the rest part (i.e., data field). And, the NDP frame may be called a short frame format.

Beacon Frame

A beacon frame is configured with MAC header, frame body and FCS. And, a prescribed number of information elements can be included in the frame body. For instance, 55 kinds of various information elements can be defined as included in the beacon frame body. In the following description, portions of the information elements included in the beacon frame body are explained for example.

A timestamp field is provided for synchronization. And, every STA having received a beacon frame is able to change/update a local clock of its own to match up with a timestamp value.

A beacon interval field indicates a time interval between beacon transmissions and is expressed by a time unit (TU). The TU can be configured with units of microseconds (μs) and can be defined as 1,024 μs for example. A timing point, at which an AP should transmit a beacon, can be expressed as TBTT (target beacon transmission time). In particular, the beacon interval field corresponds to a time interval from a transmission timing point of one beacon frame to a next TBTT. Having received a previous beacon, an STA is able to calculate a transmission timing point of a next beacon from a beacon interval field. Generally, a beacon interval can be set to 100 TU.

A capability information field includes information on capability of a device/network. For instance, a type of such a network as ad-hoc, infrastructure network and the like can be indicated through the capability information field. Moreover, the capability information field can be used to indicate a presence or non-presence of support of polling, details of encryption and the like.

Besides, SSID, supported rates, FH (Frequency Hopping) parameter set, DSSS (Direct Sequence Spread Spectrum) parameter set, CF (Contention Free) parameter set, IBSS parameter set, TIM, Country IE, Power Constraint, QoS capability, HT (High-Throughput) capability can be included in a beacon frame. Yet, the field/information included in the beacon frame is exemplary only, by which a beacon frame mentioned in the description of the present invention is non-limited.

Selective Decoding of Beacon Frame

The rest of information elements included in a beacon frame except TIM element mostly relate toe network information (or system information).

And, parameters related to the network information described as transmitted through a beacon frame can be transmitted by being included in a probe response frame. In particular, a non-associated STA transmits a probe request frame to an AP to be associated with the AP. Having received the probe request frame, the AP can transmit a probe response frame to the corresponding STA in a manner that the network information is included in the probe response frame.

According to an existing WLAN system, when network information is transmitted through a beacon, if an STA transmits the beacon, it is defined that an operation of obtaining or updating the network information by decoding the beacon is always performed. Yet, the network information is characterized in that a value of the network information is not frequently changed. Hence, after STAs have obtained network information from a beacon frame or a probe response frame at a timing point $T_0$ in an association process, if the STAs obtain network information at a timing point $T_1$ from a next beacon frame or the like, it may frequently happen that the network information at $T_0$ is equal to the network information at $T_1$. In particular, although STA frequently obtains network information, since the network information is not frequently updated, an operation of obtaining the network information is unnecessarily performed in most cases. Hence, unnecessary power consumption of the STA may increase.

Particularly, it is important to minimize power consumption for an STA of a sensor type defined in IEEE 802.11ah. To this end, it is necessary to reduce unnecessary processing of STA. For instance, it is able to reduce power consumption of STA by preventing unnecessary MPDU from being decoded.

When an STA receives a beacon, unlike an existing operation of decoding MPDU of every beacon frame, the present invention proposes a new method of decoding MPDU of a beacon frame selectively.

$1^{st}$ Embodiment

Figure 14:
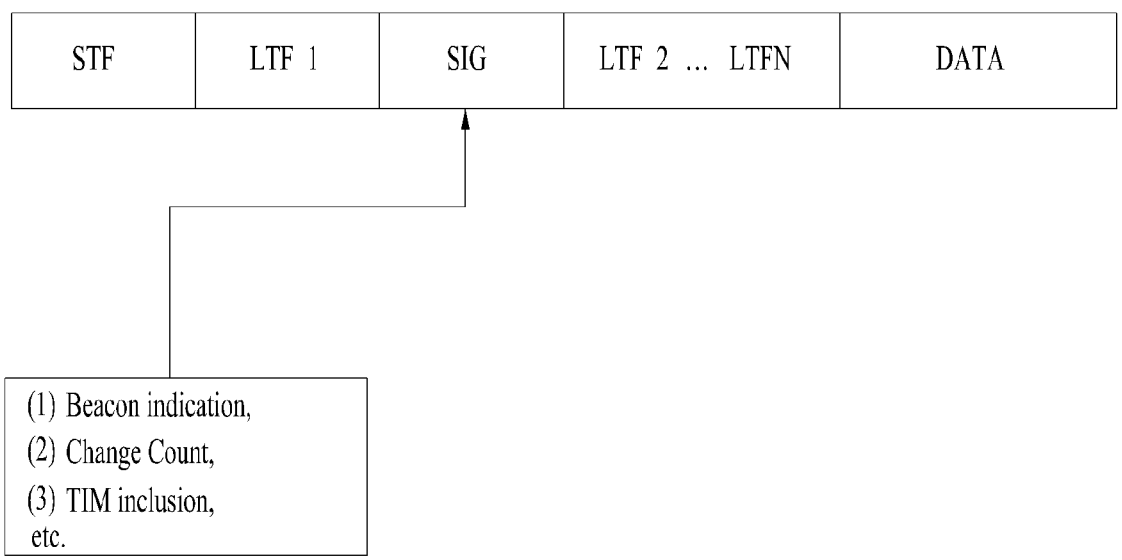
FIG. 14 is a diagram for configuration of SIG field according to one embodiment of the present invention.

FIG. 14 is a diagram for configuration of SIG field according to one embodiment of the present invention.

Although additional field(s) may be further included in an SIG field as well as sub-fields shown in FIG. 14, they are not illustrated in the drawing for clarity.

The present embodiment proposes that the following information is included in an SIG field of a frame.

(1) Beacon frame indication: Information indicating whether a received frame is a beacon frame. Hence, when an STA receives a prescribed frame, the STA is able to know whether the corresponding frame is a beacon from a beacon frame indication information in an SIG field of PPDU without decoding MPDU of the corresponding frame. According to an existing beacon frame, it is able to know ether the corresponding frame is a beacon frame from a management type information included in an MAC header of an MPDU part. Yet, since a beacon frame indication information of the present invention is included in an SIG field, it is able to know whether a corresponding frame is a beacon frame without decoding MPDU.

(2) Change count: Information indicating whether one of various network informations included in a beacon is changed at least. Each time a network information is changed, it is incremented by 1. Hence, an STA is able to recognize whether a network information included in a corresponding beacon frame is changed from change count information included in an SIG field of PPDU.

(3) TIM inclusion: Information indicating whether a TIM information element is included in a beacon. When an AP does not have a data packet to transmit to an STA operating in PS mode at a beacon transmission timing point, the AP may control a TIM information element on the corresponding STA not to be included in a beacon frame. Hence, the STA can recognize whether a TIM is included in the beacon frame without decoding MPDU of the beacon frame.

One or at least two of the above paragraphs (1) to (3) can be included in an SIG field of PPDU.

For instance, when an STA receives a prescribed frame, although a 'beacon frame indication' information included in an SIG field of the frame indicates a beacon frame, if a value of a 'change count' information is not incremented and a 'TIM inclusion' information indicates that a TIM is not included in the beacon frame, the STA can determine not to decode a data part (i.e., MPDU) of the received frame.

When information included in an SIG field of a prescribed frame indicates that the corresponding frame is a beacon frame, if it is indicated that a change count value is changed or that a TIM information element is included in the beacon frame, an STA is able to determine to decode a data part (i.e., MPDU) of the received frame.

$2^{nd}$ Embodiment

The present embodiment proposes to encode a data part (i.e., <PDU) of a beacon frame into two parts in accordance with attributes of informations.

Figure 15:
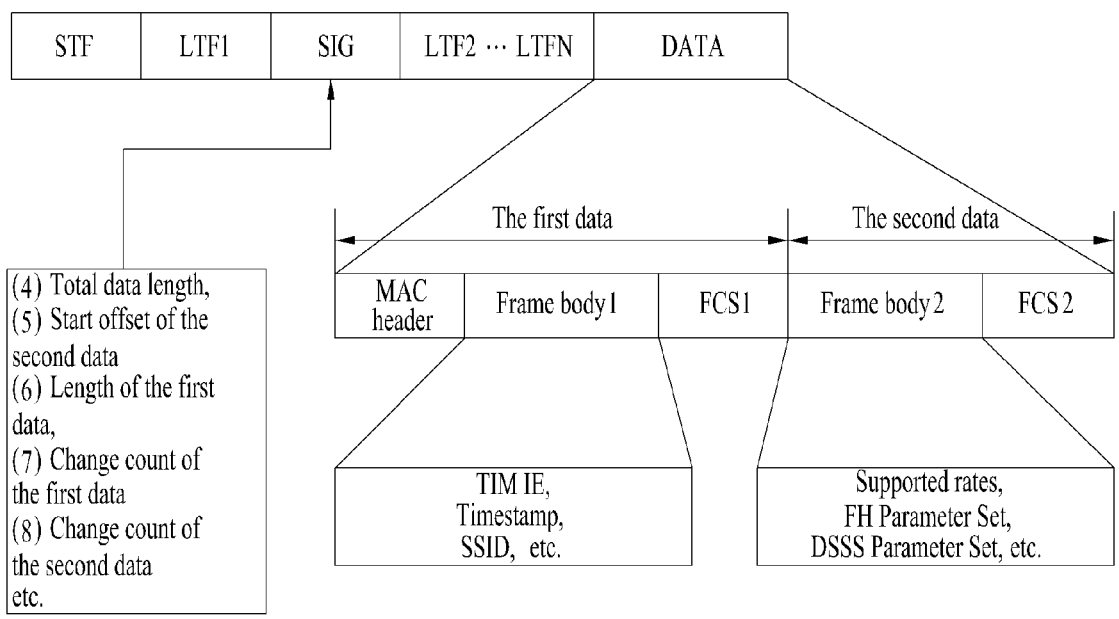
FIG. 15 is a diagram for configuration of a data part according to one embodiment of the present invention.

FIG. 15 is a diagram for configuration of a data part according to one embodiment of the present invention.

For instance, an AP is able to divide a data part of a beacon frame into a first data part and a second data part. In the first data part, TIM and essential system information (e.g., timestamp, change sequence, duration to next full beacon, etc.) can be included. In the second data part, other network information (e.g., SSID IF, capability, supported rates, FH parameter set, DSSS parameter set, etc.) can be included.

Alternatively, in the first data part, information indicating a presence or non-presence of TIM inclusion and essential system information (e.g., timestamp, change sequence, duration to next full beacon, etc.) can be included. In the second data part, other network information (e.g., SSID IF, capability, supported rates, FH parameter set, DSSS parameter set, etc.) can be included. In particular, as the information indicating a presence or non-presence of TIM inclusion is included in the first data part (e.g., an inside of an FC field of a MAC header, a specific field in the MAC header, an inside of a body of the first data part, etc.) instead of being included in an SIG, an STA (e.g., an STA operational in PS mode (i.e., PS STA)) can be informed whether a TIM is included. Based on the information indicating whether the TIM is included in the first data part, the STA (e.g., PS STA) is able to determine whether to process the $2^{nd}$ data part (e.g., to continue reading, to decode, etc.). If the STA processes the first data part and then determines that the TIM is not included in the corresponding fame, the STA can stop processing the beacon frame (i.e., decoding the remaining $2^{nd}$ data part).

A static information (i.e., non-frequently changed information) is included one of the first data part and the second data part and a dynamic information (i.e., frequently changed information) can be included in the other.

Referring to FIG. 15, a data part of a beacon frame can be configured with a single MAC header and a pair of (frame body+FCS). In particular, a first data part can be configured with 'MAC header+$1^{st}$ frame body+$1^{st}$ FCS'. And, a second data part can be configured with '$2^{nd}$ frame body+$2^{nd}$ FCS'. The first data part and the second data part can be transmitted in a manner of being separately encoded. And, the first data part and the second data part can be encoded using the same MCS. Thus, the first data part and the second data part can be named a first encoded data part and a second encoded data part, respectively.

Thus, in order for an STA to decode the data separately encoded into the first data part and the second data part, the STA should be aware of a length of the first data part or a start location of the second data part. Hence, information for enabling the STA to calculate the length of the first data part or the start location of the second data part can be included in an SIG field by an AP.

The present embodiment proposes that the following information is included in an SIG field of a beacon frame.

(4) Total data length: Information indicating a length of total data part amounting to a sum of the first data part and the second data part.

(5) Start offset of the second data: Information indicating a difference value of a location from which the second data part starts with reference to a start location of the total data part. Hence, an STA is able to know a start location of the second data part (i.e., an end location of the first data part).

(6) Length of the first data: Information indicating a length of the first data part. Hence, an STA can be aware that the second data part starts right from a location spaced apart from the start location of the total data part by a length of the first data part. And, a length of the $2^{nd}$ data part can be determined as (total data length–first data part length).

In addition, the change count information proposed by the paragraph (2) of the $1^{st}$ embodiment can be defined as a separate change count for each of the first data and the second data. In particular, the following information can be included in the SIG field proposed by the present invention.

(7) Change count of the first data: Information indicating whether one of network informations belonging to the first data is changed at least. This information is incremented by 1 each time network information of the first data is changed.

(8) Change count of the second data: Information indicating whether one of network informations belonging to the second data is changed at least. This information is incremented by 1 each time network information of the second data is changed.

One or at least two of the paragraphs (4) to (8) can be included in an SIG field of PPDU together. Considering the informations (1) to (3) inclusive in the SIG field according to the $1^{st}$ embodiment, one or at least two of the paragraphs (1) to (8) can be included in the SIG field of the PPDU together.

For instance, in case that an STA receives a prescribed frame, it is able to confirm that the corresponding frame is a beacon frame from information (e.g., beacon indication information) included in an SIG field. In this case, the STA checks change count information of a second data part in the SIG field. If the change count information is changed, the STA performs a decoding of the second data part. If the change count information is changed, the STA does not perform a decoding of the second data part.

In particular, for instance, based on information (e.g., change count information on the first/second data part), the STA can confirm that the second data part is changed despite that the first data part is not changed. In this case, based on information (e.g., a length of the first data part, a start offset of the second data part, etc.) for determining a location of the second data part, the STA can determine a location of the second data part and may be able to decode the second data part only without decoding the first data part.

If a TIM indication information of an SIG field is set to 0 (i.e., if it is indicated that a TIM information element is not included in a beacon frame), an STA may not perform a decoding on a data part (e.g., first data part) having the TIM indication information included therein.

If it is checked that a TIM information element is not included in a beacon frame from information included in an SIG field and it is also checked that a network information is not changed based on the information included in the SIG field, an STA may not perform a decoding on every data part (e.g., both first and second data parts (i.e., MPDU) of a beacon.

Moreover, a change count for the second data part may be included not in the SIG field but in the first data part. According to this, the STA operates to decode the first data part all the time. And, the STA can operate in a manner of checking a change count value for the second data part from a result from decoding the first data part and then selectively decoding the second data part. In this case, dynamic information can be included in the first data part, while static information can be included in the second data part.

Figure 16:
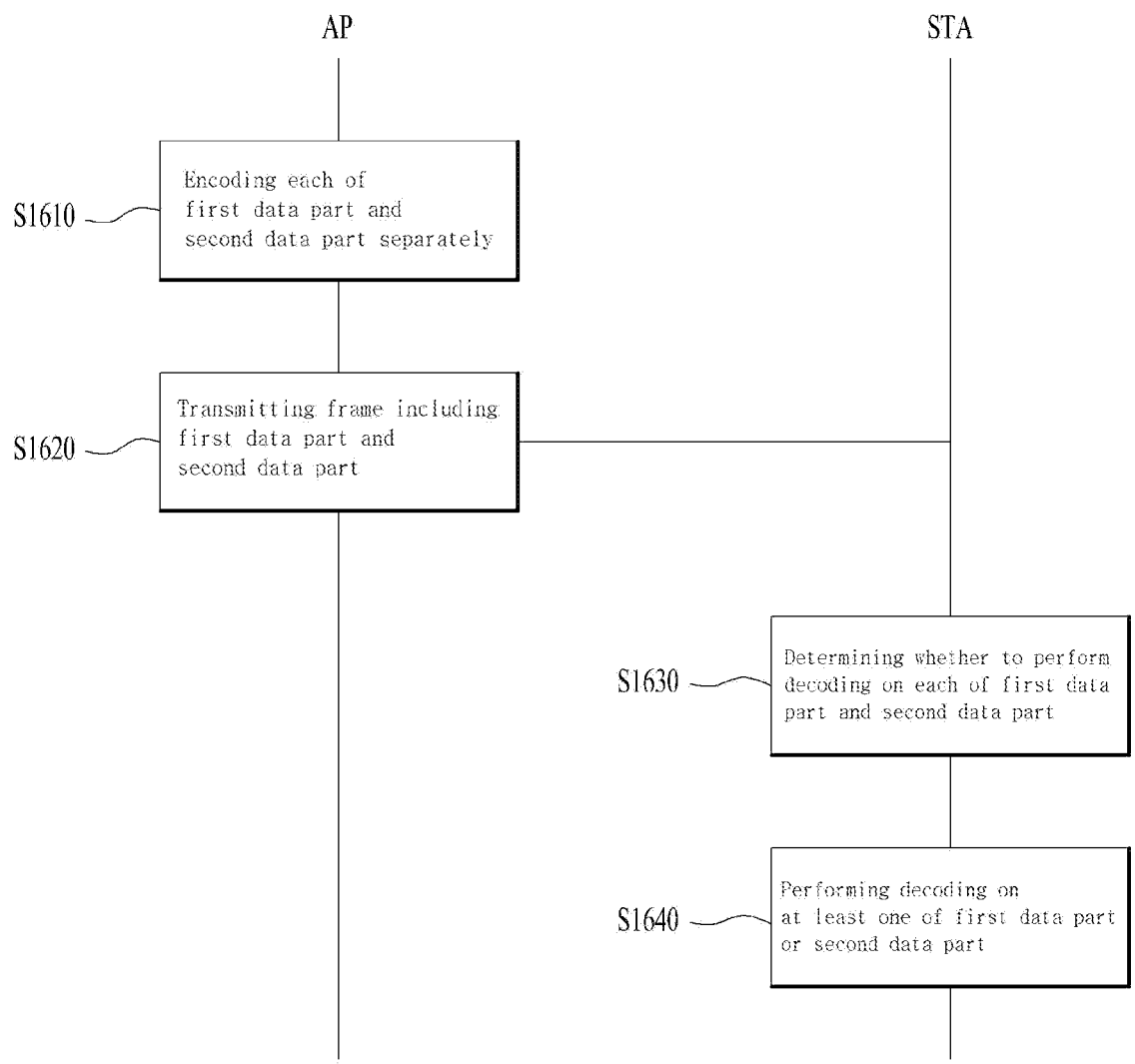
FIG. 16 is a diagram to describe a method of selectively decoding a beacon frame according to one embodiment of the present invention.

FIG. 16 is a diagram to describe a method of selectively decoding a beacon frame according to one embodiment of the present invention.

In a step S1610, an AP is able to create a first data part (i.e., a first encoded data part) and a second data part (i.e., a second encoded data part) by separately encoding a first data and a second data, respectively.

In a step S1620, the AP can transmit a frame including the first data part and the second data part to an STA. In this case, information used for a selective decoding on the first data part and the second data part by the STA can be included in the frame (i.e., PPDU frame format) transmitted by the AP. For instance, the information used for the selective decoding can include at least one of a change counter, information indicating a presence or non-presence of TIM inclusion, and information for determining a start location of the $2^{nd}$ data part and can be included in an SIG field of the frame for example.

In a step S1630, the STA can determine whether to perform a decoding on the first data part and the second data part of the frame transmitted by the AP. For instance, the determination on whether to perform the decoding can be based on the information included in the SIG filed of the frame to be used for the selective decoding.

In a step S1640, depending on the determination on whether to perform the decoding, the STA is able to perform the decoding on the first data part, the second data part, or the first data part and the second data part. If the step S1630 determines not to decode both of the first data part and the second data part, the step S1640 can be skipped.

In the method of performing/supporting the selective decoding of the beacon frame according to the present invention exemplarily shown in FIG. 16, the contents and/or items explained in the above descriptions of the various embodiments of the present invention may be independently applicable or at least two embodiments of the present invention may be simultaneously applicable.

Figure 17:
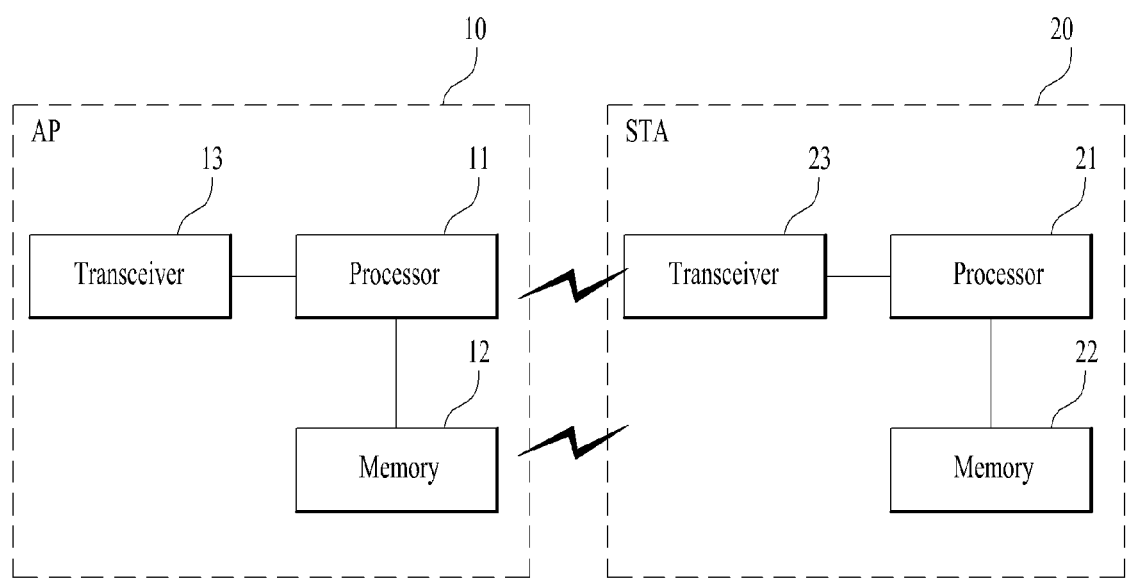
FIG. 17 is a block diagram for configuration of a wireless device according to one embodiment of the present invention.

FIG. 17 is a block diagram for a configuration of a wireless device according to one embodiment of the present invention.

An AP 10 may include a processor 11, a memory 12 and a transceiver 13. An STA 20 may include a processor 21, a memory 22 and a transceiver 23. The transceiver 13/23 can transmit and receive radio signals and is able to implement a physical layer according to IEEE 802 system for example. The processor 11/21 is connected to the transceiver 13/23 and is able to implement a physical layer and/or a MAC layer according to IEEE 802 system. The processor 11/21 can be configured to perform operations according to the various embodiments of the present invention mentioned in the above description. And, a module for implementing operations of the AP/STA according to the various embodiments of the present invention mentioned in the foregoing description are saved in the memory 12/22 and can be executed by the processor 11/21. The memory 12/22 is included in the processor 11/21. Alternatively, the memory 12/22 is installed outside the processor 11/21 and can be connected to the processor 11/21 via a means known to the public.

In the above-mentioned detailed configurations of the AP and STA devices, the contents or items explained in the descriptions of the various embodiments of the present invention may be independently applicable or at least two embodiments of the present invention may be simultaneously applicable. And, redundant descriptions shall be omitted from the following description for clarity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein but intends to give a broadest scope matching the principles and new features disclosed herein.

INDUSTRIAL APPLICABILITY

The embodiments of the present invention mentioned in the foregoing description are mainly explained with reference to IEEE 802.11 system and may be applicable in the same manners to various kinds of mobile communication systems.

What is claimed is:

1. A method of receiving a frame by a station (STA) in a wireless communication system, the method comprising:
   receiving, by the STA, a frame including a first data part and a second data part from an access point (AP);
   wherein the frame further includes information used for determining, by the STA, whether to perform decoding of at least one of the first data part and the second data part,
   determining, by the STA, whether to perform the decoding of at least one of the first data part and the second data part of the frame using the information included in the frame;
   performing, by the STA, the decoding of at least one of the first data part and the second data part when it is determined that the decoding is to be performed,
   wherein whether to perform the decoding is determined based on a change of at least one of the first data part and the second data part;
   transmitting, by the STA, a power save-poll (PS-Poll) frame to the AP based on the decoded frame; and
   receiving, by the STA, data from the AP based on the PS-Poll frame.

2. The method of claim 1, wherein whether to perform the decoding is determined using information included in an SIG (signal) field of the frame.

3. The method of claim 2, wherein the SIG field includes change count information.

4. The method of claim 2, wherein the SIG field includes at least one of change count information on the first data part and change count information on the second data part.

5. The method of claim 2, wherein if a value of change count information on the first data part is incremented, it is determined to perform the decoding on the first data part, and
   wherein if a value of change count information on the second data part is incremented, it is determined to perform the decoding on the second data part.

6. The method of claim 2, wherein the SIG field includes at least one of:
   information indicating a total length of the first data part and the second data part,
   information indicating a total length of the first data part, and
   information indicating a start offset of the second data part.

7. The method of claim 2, wherein the SIG field includes at least one of:
   information indicating whether the frame is a beacon frame, and
   information indicating whether a TIM (traffic indication map) information element is included in one of the first data part or the second data part.

8. The method of claim 1, wherein the first data part includes information indicating whether a TIM information element is included in the frame.

9. The method of claim 8, wherein if the information indicating whether the TIM information element is included indicates that the TIM information element is not included in the frame, it is determined not to decode the second data part.

10. The method of claim 1, wherein the first data part includes a MAC (medium access control) header, a first frame body and a first FCS (frame check sequence) field.

11. The method of claim 1, wherein the second data part includes a second frame body and a second FCS field.

12. The method of claim 1, wherein the frame comprises a PPDU (physical layer convergence protocol (PLCP) packet data unit) frame, wherein the frame further includes an STF (short training field) and an LTF (long training field), and
   wherein the first data part and the second data part are included in an MPDU (MAC PDU) part of the PPDU frame.

13. A method of transmitting a frame by an access point (AP) in a wireless communication system, the method comprising:
   transmitting, by the AP, a frame including a first data part and a second data part to a station (STA),
   wherein the first data part and the second data part of the frame are encoded separately,
   wherein the frame further includes information used for determining, by the STA, whether to perform decoding of at least one of the first data part and the second data part, and
   wherein whether to perform the decoding is determined based on a change of at least one of the first data part and the second data part,
   receiving, by the AP, a power save-poll (PS-Poll) frame from the STA based on a decoded frame; and
   transmitting, by the AP, data to the STA based on the PS-Poll frame.

14. A station device for receiving a frame in a wireless communication system, the station device comprising:
   a transceiver; and
   a processor,
   wherein the processor:
   controls the transceiver to receive a frame including a first data part and a second data part from an access point (AP),
   wherein the frame further includes information used for determining, by the STA, whether to perform decoding of at least one of the first data part and the second data part,
   determines whether to perform the decoding of at least one of the first data part and the second data part of the frame using the information,
   performs the decoding of at least one of the first data part and the second data part when it is determined that the decoding is to be performed,
   wherein whether to perform the decoding is determined based on a change of at least one of the first data part and the second data part,
   controls the transceiver to transmit a power save-poll (PS-Poll) frame to the AP based on the decoded frame using the transceiver, and
   controls the transceiver to receive data from the AP based on the PS-Poll frame.

15. An access point (AP) device for transmitting a frame in a wireless communication system, the AP comprising:

a transceiver; and
a processor,
wherein the processor:
controls the transceiver to transmit a frame including a first data part and a second data part to a station (STA),
wherein the first data part and the second data part of the frame are encoded separately,
wherein the frame further includes information used for determining, by the STA, whether to perform decoding of at least one of the first data part and the second data part, and
wherein whether to perform the decoding is determined based on a change of at least one of the first data part and the second data part,
controls the transceiver to receive a power save-poll (PS-Poll) frame from the STA based on a decoded frame, and
controls the transceiver to transmit data to the STA based on the PS-Poll frame.

* * * * *